(12) United States Patent
Kurneta et al.

(10) Patent No.: US 12,538,022 B2
(45) Date of Patent: Jan. 27, 2026

(54) ASYNCHRONOUS IMAGE CAPTURE, VERIFICATION, AND ERROR TRACKING

(71) Applicant: Optum, Inc., Minnetonka, MN (US)

(72) Inventors: Aaron M. Kurneta, Chandler, AZ (US); Adam De-Nyangos, Mesa, AZ (US); Frank Martinez Triana, Chandler, AZ (US); Eric Gordon, Charlotte, NC (US); Holmberg Lopez, Bonsall, CA (US); Michael L. Mahar, Tempe, AZ (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/781,005

(22) Filed: Jul. 23, 2024

(65) Prior Publication Data
US 2025/0328411 A1    Oct. 23, 2025

Related U.S. Application Data

(60) Provisional application No. 63/637,637, filed on Apr. 23, 2024.

(51) Int. Cl.
*G06F 11/07*    (2006.01)

(52) U.S. Cl.
CPC ...... *G06F 11/0793* (2013.01); *G06F 11/0709* (2013.01); *G06F 11/0733* (2013.01); *G06F 11/079* (2013.01)

(58) Field of Classification Search
CPC ............. G06F 11/0793; G06F 11/0709; G06F 11/0733; G06F 11/079
See application file for complete search history.

(56) References Cited

U.S. PATENT DOCUMENTS

| 4,015,645 A | 4/1977 | Chamberlin |
| 7,076,085 B1 | 7/2006 | Sah |

(Continued)

FOREIGN PATENT DOCUMENTS

| CN | 107454364 A | 12/2017 |
| CN | 110619617 A | 12/2019 |

(Continued)

OTHER PUBLICATIONS

IQS Directory, "Machine Vision System: What is it?", (38 pages), Retrieved online Nov. 18, 2024 at https://www.iqsdirectory.com/articles/machine-vision-system.html.

(Continued)

*Primary Examiner* — Jigar P Patel
(74) *Attorney, Agent, or Firm* — Alston & Bird LLP

(57) ABSTRACT

Various embodiments of the present disclosure provide an asynchronous imaging technique. The asynchronous imaging technique may include identifying, from a local object queue buffer including a portion of container data from a remote system, a queued container data object that corresponds to a container located on a conveyance line. In addition, the process may include generating, using an imaging device, an imaging response for the container and a verification event for the container based on the imaging response. The process may listen for a heartbeat and identify a heartbeat anomaly with the remote system. In response to the heartbeat anomaly, the imaging system may generate a connection loss alarm tag, store the verification event in a local image buffer with the connection loss alarm tag, and initiating one or more conveyance line operation instructions based on a position of the queued container data object within the local object queue buffer.

20 Claims, 9 Drawing Sheets

(56) References Cited

U.S. PATENT DOCUMENTS

| | | |
|---|---|---|
| 7,983,779 B2 | 7/2011 | Kotula |
| 8,121,392 B2 | 2/2012 | Popovich, Jr. et al. |
| 10,121,034 B1 | 11/2018 | Bathurst et al. |
| 10,229,487 B2 | 3/2019 | Goyal et al. |
| 10,947,708 B2 | 3/2021 | Chung |
| 12,024,367 B1 | 7/2024 | Day et al. |
| 2007/0174071 A1 | 7/2007 | Hunscher et al. |
| 2011/0075156 A1 | 3/2011 | Patel et al. |
| 2014/0025198 A1 | 1/2014 | Mattern et al. |
| 2015/0113324 A1* | 4/2015 | Factor ............... G06F 3/0647 714/20 |
| 2015/0186206 A1* | 7/2015 | Bhattacharya ...... G06F 11/3027 714/3 |
| 2015/0206095 A1 | 7/2015 | De Boer |
| 2015/0341542 A1 | 11/2015 | Preston |
| 2016/0299114 A1 | 10/2016 | Guthrie et al. |
| 2018/0164143 A1 | 6/2018 | Gurumohan et al. |
| 2018/0194573 A1 | 7/2018 | Iwai et al. |
| 2018/0286200 A1* | 10/2018 | Gordon ............... G08B 29/18 |
| 2020/0033179 A1 | 1/2020 | Gurumohan et al. |
| 2020/0276996 A1 | 9/2020 | Gresset |
| 2023/0129436 A1 | 4/2023 | Park et al. |
| 2023/0132104 A1 | 4/2023 | Bossaer et al. |
| 2023/0229139 A1* | 7/2023 | Nicholls .............. G05D 1/0088 700/245 |

FOREIGN PATENT DOCUMENTS

| | | |
|---|---|---|
| WO | 2021/225876 A1 | 11/2021 |
| WO | 2022/263100 A1 | 12/2022 |
| WO | 2023/129436 A1 | 7/2023 |

OTHER PUBLICATIONS

Trujillo, et al., "Container Monitoring with Infrared Catadioptric Imaging and Automatic Intruder Detection", SN Applied Sciences, vol. 1, (25 pages), Nov. 25, 2019, https://doi.org/10.1007/s42452-019-1721-8.

Non-Final Rejection Mailed on Jun. 30, 2025 for U.S. Appl. No. 18/780,982, 10 page(s).

Notice of Allowance and Fees Due (PTOL-85) Mailed on Nov. 4, 2025 for U.S. Appl. No. 18/780,982, 7 page(s).

Non-Final Rejection Mailed on Nov. 28, 2025 for U.S. Appl. No. 18/780,987, 16 page(s).

* cited by examiner

ASYNCHRONOUS IMAGE CAPTURE, VERIFICATION, AND ERROR TRACKING

CROSS-REFERENCE TO RELATED APPLICATIONS

This application claims the benefit of U.S. Provisional Application No. 63/637,637, entitled "ENHANCED IMAGING SYSTEM," and filed Apr. 23, 2024, the entire contents of which are herein incorporated by reference.

BACKGROUND

Various embodiments of the present disclosure address technical challenges related to networked imaging systems. Traditionally, imaging systems are used to capture images of objects using camera settings that establish a focus level of an imaging device by modifying a lighting, lens attenuation, and other hardware and software aspects of the imaging device. The quality of the resulting images depends on the correlation of the focus level to the circumstances, such as the lighting, distance, and/or the like, of the imaging event. This leads to varying imaging quality in systems, such as conveyance lines, in which the distance between the imaging system and an imaged object is object dependent.

Moreover, in conveyance lines and other systems that perform continuous image-based validations of objects, an imaging system may communicate with remote systems over a network to facilitate the performance of an imaging task. This makes networked imaging system's susceptible to faults in the performance of an imaging system due to errors unrelated to the hardware or software components of the imaging systems, including network related errors and/or errors at a remote system communicatively connected to the imaging system.

Various embodiments of the present disclosure make important contributions to traditional imaging system by addressing these technical challenges, among others.

BRIEF SUMMARY

Various embodiments of the present disclosure provide improved imaging techniques that enable the asynchronous image capture, verification, and error tracking of a networked imaging system. For example, some of the techniques of the present disclosure provide a new error tracking and handling process that leverages asynchronous image capture and verification capabilities to detect and handle communication errors without impacting throughput of a conveyance line. The error tracking and handling technique may employ heartbeat tracking mechanisms to continuously monitor a connection between an imaging system and one or more networked systems. Imaging tasks are buffered at the imaging system such that, in the event of a loss of connection, the imaging system may asynchronously continue to capture images for a duration of time while the connected system is debugged. By doing so, the techniques of the present disclosure may improve imaging technology by enhancing the reliability and error tolerance of imaging systems. In some examples, these improvements may be integrated with a conveyance line to improve the continuous verification of items moved across the conveyance line.

In some embodiments, a computer-implemented method includes identifying, by one or more processors and from a local object queue buffer comprising a portion of container data from a remote system, a queued container data object that corresponds to a container located on a conveyance line; generating, by the one or more processors and using an imaging device, an imaging response for the container; generating, by the one or more processors, a verification event for the container based on the imaging response; identifying, by the one or more processors, a heartbeat anomaly with the remote system; in response to the heartbeat anomaly, (i) generating a connection loss alarm tag, (ii) storing the verification event in a local image buffer with the connection loss alarm tag, and (iii) initiating one or more conveyance line operation instructions based on a position of the queued container data object within the local object queue buffer.

In some embodiments, a computing system includes memory and one or more processors communicatively coupled to the memory, the one or more processors are configured to identify, from a local object queue buffer comprising a portion of container data from a remote system, a queued container data object that corresponds to a container located on a conveyance line; generate, using an imaging device, an imaging response for the container; generate a verification event for the container based on the imaging response; identify a heartbeat anomaly with the remote system; in response to the heartbeat anomaly, (i) generating a connection loss alarm tag, (ii) storing the verification event in a local image buffer with the connection loss alarm tag, and (iii) initiating one or more conveyance line operation instructions based on a position of the queued container data object within the local object queue buffer.

In some embodiments, one or more non-transitory computer-readable storage media include instructions that, when executed by one or more processors, cause the one or more processors to identify, from a local object queue buffer comprising a portion of container data from a remote system, a queued container data object that corresponds to a container located on a conveyance line; generate, using an imaging device, an imaging response for the container; generate a verification event for the container based on the imaging response; identify a heartbeat anomaly with the remote system; in response to the heartbeat anomaly, (i) generating a connection loss alarm tag, (ii) storing the verification event in a local image buffer with the connection loss alarm tag, and (iii) initiating one or more conveyance line operation instructions based on a position of the queued container data object within the local object queue buffer.

DETAILED DESCRIPTION

Figure 1:
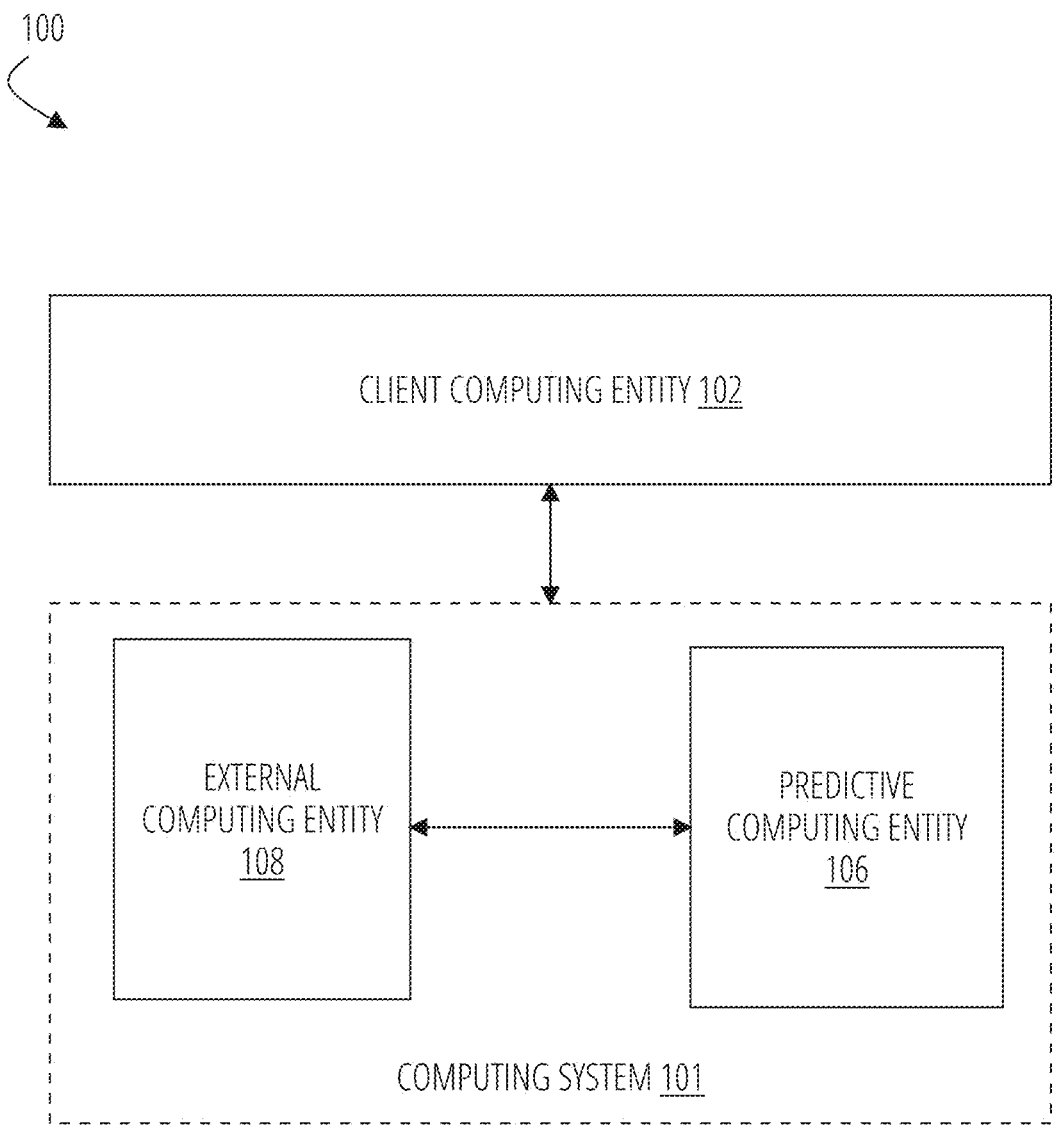
FIG. 1 provides an example overview of an architecture in accordance with some embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 provides an example overview of an architecture 100 in accordance with some embodiments of the present disclosure. The architecture 100 includes a computing system 101 and a plurality of client computing entities 102. The example architecture 100 may be used in a plurality of domains and not limited to any specific application as disclosed herewith. The plurality of domains may include banking, healthcare, industrial, manufacturing, education, retail, technology, to name a few.

In accordance with various embodiments of the present disclosure, one or more machine learning models may be trained to generate image classifications, classification scores, and/or the like. The models may form ensemble architecture that may be configured to automatically evaluate validation images to generate model outputs to perform an image verification task.

In some embodiments, the computing system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The computing system 101 may include a predictive computing entity 106 and one or more external computing entities 108. The predictive computing entity 106 and/or one or more external computing entities 108 may be individually and/or collectively configured to receive requests from client computing entities 102, process the requests to generate outputs, such as image classifications, classification scores, and/or the like, and provide the generated outputs to the client computing entities 102.

For example, as discussed in further detail herein, the predictive computing entity 106 and/or one or more external computing entities 108 comprise storage subsystems that may be configured to store input data, training data, and/or the like that may be used by the respective computing entities to perform predictive data analysis and/or training operations of the present disclosure. In addition, the storage subsystems may be configured to store model definition data used by the respective computing entities to perform various predictive data analysis and/or training tasks. The storage subsystem may include one or more storage units, such as multiple distributed storage units that are connected through a computer network. Each storage unit in the respective computing entities may store at least one of one or more data assets and/or one or more data about the computed properties of one or more data assets. Moreover, each storage unit in the storage systems may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In some embodiments, the predictive computing entity 106 and/or one or more external computing entities 108 are communicatively coupled using one or more wired and/or wireless communication techniques. The respective computing entities may be specially configured to perform one or more steps/operations of one or more techniques described herein. By way of example, the predictive computing entity 106 may be configured to train, implement, use, update, and evaluate machine learning models in accordance with one or more training and/or inference operations of the present disclosure. In some examples, the external computing entities 108 may be configured to train, implement, use, update, and evaluate machine learning models in accordance with one or more training and/or inference operations of the present disclosure.

In some example embodiments, the predictive computing entity 106 may be configured to receive and/or transmit one or more datasets, objects, and/or the like from and/or to the external computing entities 108 to perform one or more steps/operations of one or more techniques (e.g., imagining techniques, and/or the like) described herein. The external computing entities 108, for example, may include and/or be associated with one or more entities that may be configured to receive, transmit, store, manage, and/or facilitate datasets. The external computing entities 108, for example, may include data sources that may provide such datasets, and/or the like to the predictive computing entity 106 which may leverage the datasets to perform one or more steps/operations of the present disclosure, as described herein. In some examples, the datasets may include container databases, order databases, and/or the like that may collect data from across a plurality of external computing entities 108 into one or more aggregated datasets. The external computing entities 108, for example, may be associated with one or more data repositories, cloud platforms, compute nodes, organizations, and/or the like, which may be individually and/or collectively leveraged by the predictive computing entity 106 to obtain and aggregate data for a prediction domain.

In some example embodiments, the predictive computing entity 106 may be configured to receive a trained machine learning model trained and subsequently provided by the one or more external computing entities 108. For example, the one or more external computing entities 108 may be configured to perform one or more training steps/operations of the present disclosure to train a machine learning model, as described herein. In such a case, the trained machine learning model may be provided to the predictive computing entity 106, which may leverage the trained machine learning model to perform one or more inference steps/operations of the present disclosure. In some examples, feedback (e.g., evaluation data, ground truth data, etc.) from the use of the machine learning model may be recorded by the predictive computing entity 106. In some examples, the feedback may be provided to the one or more external computing entities 108 to continuously train the machine learning model over time. In some examples, the feedback may be leveraged by the predictive computing entity 106 to continuously train the machine learning model over time. In this manner, the computing system 101 may perform, via one or more combinations of computing entities, one or more prediction, training, and/or any other machine learning-based techniques of the present disclosure.

A. Example Predictive Computing Entity

Figure 2:
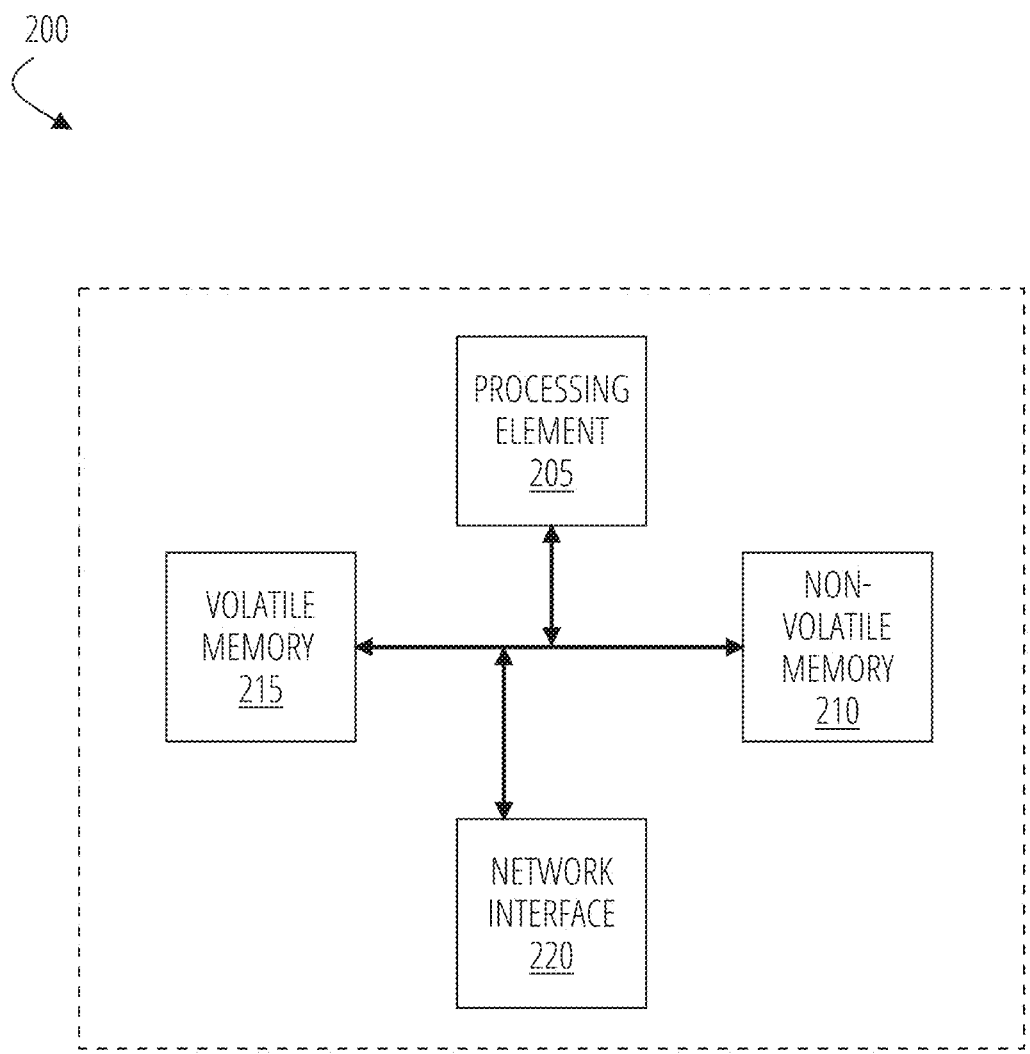
FIG. 2 provides an example predictive data analysis computing entity in accordance with some embodiments of the present disclosure.

FIG. 2 provides an example computing entity 200 in accordance with some embodiments of the present disclosure. The computing entity 200 is an example of the predictive computing entity 106 and/or external computing entities 108 of FIG. 1. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, training one or more machine learning models, monitoring, evaluating, comparing, and/or similar terms used herein interchangeably. In some embodiments, these functions, operations, and/or processes may be performed on data, content, information, and/or similar terms used herein interchangeably. In some embodiments, the one computing entity (e.g., predictive computing entity 106, etc.) may train and use one or more machine learning models described herein. In other embodiments, a first computing entity (e.g., predictive computing entity 106, etc.) may use one or more machine learning models that may be trained by a second computing entity (e.g., external computing entity 108) communicatively coupled to the first computing entity. The second computing entity, for example, may train one or more of the machine learning models described herein, and subsequently provide the trained machine learning model(s) (e.g., optimized weights, code sets, etc.) to the first computing entity over a network.

As shown in FIG. 2, in some embodiments, the computing entity 200 may include, or be in communication with, one or more processing elements 205 (also referred to as processors, processing circuitry, and/or similar terms used herein interchangeably) that communicate with other elements within the computing entity 200 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the computing entity 200 may further include, or be in communication with, non-volatile media (also referred to as non-volatile storage, memory, memory storage, memory circuitry, and/or similar terms used herein interchangeably). In some embodiments, the non-volatile media may include one or more non-volatile memory 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile media may store databases, database instances, database management systems, data, applications, programs, program modules, scripts, code (e.g., source code, object code, byte code, compiled code, interpreted code, machine code, etc.) that embodies one or more machine learning models or other computer functions described herein, executable instructions, and/or the like. The term database, database instance, database management system, and/or similar terms used herein interchangeably, may refer to a collection of records or data that is stored in a computer-readable storage medium using one or more database models; such as a hierarchical database model, network model, relational model, entity-relationship model, object model, document model, semantic model, graph model, and/or the like.

In some embodiments, the computing entity 200 may further include, or be in communication with, volatile media (also referred to as volatile storage, memory, memory storage, memory circuitry, and/or similar terms used herein interchangeably). In some embodiments, the volatile media may also include one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, code (source code, object code, byte code, compiled code, interpreted code, machine code) that embodies one or more machine learning models or other computer functions described herein, executable instructions, and/or the like being executed by, for example, the processing element 205. Thus, the databases, database instances, database management systems, data, applications, programs, program modules, code (source code, object code, byte code, compiled code, interpreted code, machine code) that embodies one or more machine learning models or other computer functions described herein, executable instructions, and/or the like may be used to control certain aspects of the operation of the computing entity 200 with the assistance of the processing element 205 and operating system.

As indicated, in some embodiments, the computing entity 200 may also include one or more network interfaces 220 for communicating with various computing entities (e.g., the client computing entity 102, external computing entities, etc.), such as by communicating data, code, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In some embodiments, the computing entity 200 communicates with another computing entity for uploading or downloading data or code (e.g., data or code that embodies or is otherwise associated with one or more machine learning models). Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing entity 200 may include, or be in communication with, one or more input elements, such as a keyboard input, a mouse input, a touch screen/display input, motion input, movement input, audio input, pointing device input, joystick input, keypad input, and/or the like. The computing entity 200 may also include, or be in communication with, one or more output elements (not shown), such as audio output, video output, screen/display output, motion output, movement output, and/or the like.

B. Example Client Computing Entity

Figure 3:
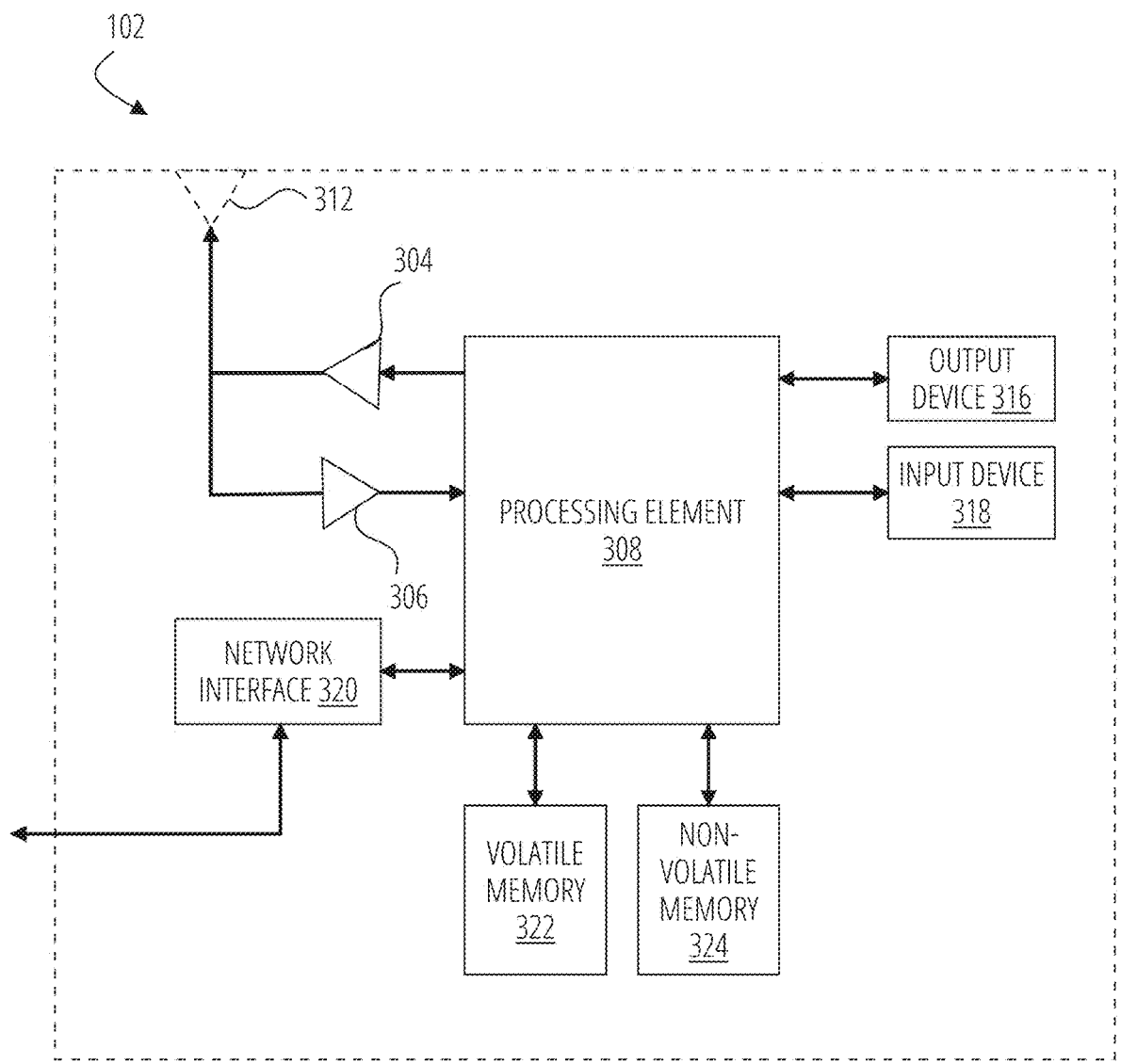
FIG. 3 provides an example client computing entity in accordance with some embodiments of the present disclosure.

FIG. 3 provides an example client computing entity in accordance with some embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 may be operated by various parties. As shown in FIG. 3, the client computing entity 102 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the computing entity 200. In some embodiments, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the computing entity 200 via a network interface 320.

Via these communication standards and protocols, the client computing entity 102 may communicate with various other entities using mechanisms such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 may also download code, changes, add-ons, and updates, for instance, to its firmware, software (e.g., including executable instructions, applications, program modules), and operating system.

According to some embodiments, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In some embodiments, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client computing entity 102 in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something within inches or centimeters.

The client computing entity 102 may also comprise a user interface (that may include an output device 316 (e.g., display, speaker, tactile instrument, etc.) coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the computing entity 200, as described herein. The user input interface may comprise any of a plurality of input devices 318 (or interfaces) allowing the client computing entity 102 to receive code and/or data, such as a keypad (hard or soft), a touch display, voice/speech or motion interfaces, or other input device. In some embodiments including a keypad, the keypad may include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client computing entity 102 may also include volatile memory 322 and/or non-volatile memory 324, which may be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory may store databases, database instances, database management systems, data, applications, programs, program modules, scripts, code (source code, object code, byte code, compiled code, interpreted code, machine code, etc.) that embodies one or more machine learning models or other computer functions described herein, executable instructions, and/or the like to implement the functions of the client computing entity 102. As indicated, this may include a user application that is resident on the client computing entity 102 or accessible through a browser or other user interface for communicating with the computing entity 200 and/or various other computing entities.

In another embodiment, the client computing entity 102 may include one or more components or functionalities that are the same or similar to those of the computing entity 200, as described in greater detail above. In one such embodiment, the client computing entity 102 downloads, e.g., via network interface 320, code embodying machine learning model(s) from the computing entity 200 so that the client computing entity 102 may run a local instance of the machine learning model(s). As will be recognized, these architectures and descriptions are provided for example purposes only and are not limited to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

III. EXAMPLES OF CERTAIN TERMS

In some embodiments, the term "conveyance line" refers to a component of the fulfillment system that is configured to move (e.g., through friction or other forces) items, containers, container carriers, and/or the like to, from, and/or between one or more locations within the fulfillment system. In some examples, a conveyance line may include an assembly, arrangement, system, and/or the like that includes a plurality of conveyers. In some examples, a conveyance line may include an end-to-end closed conveyance line that is configured to transport (e.g., move, route, etc.) a plurality of objects (e.g., containers, container carriers, combinations thereof, etc.) between one or more points within a fulfillment system. The conveyance line may include a plurality of at least partially connected portions, each configured to move a plurality of objects (e.g., containers, container carriers, combinations thereof, etc.) to, from, and/or between multiple points within the fulfillment system.

The conveyance line may be configured to move, via a plurality of connected conveyers, an object (e.g., a container, container carrier, etc.) between one or more stations within a fulfillment system. The plurality of stations may include dispensing stations (and/or filling, packing, etc. stations) for placing items within a container (e.g., a pill vial, a package, etc.), imaging stations for verifying the contents of a container, among other types of stations designed to accurately fulfill an order. In some examples, one or more imaging stations may include imaging locations along the conveyance line that are associated with an imaging system configured to validate the contents within a container as the container is moved across the fulfillment system.

In some embodiments, the term "conveyer" refers to a component of the conveyance line. A conveyer may include one or more moving surfaces (e.g., one or more belts, one or more rollers, etc.), which may exert one or more directional forces on one or more objects placed on the conveyer. In some examples, a conveyer may be controlled by a conveyance control system. It should be understood that a conveyer or conveyer belt, as described herein, may be configured as a conventional conveyer belt, such that it is formed and/or extended around at least two driving wheels. By turning the driving wheels, the conveyer belt may run cyclically (e.g., continuously around the driving wheels). The conveyer belt may thus, like conventional belts of this nature, be made from a multitude of materials, linkages, and so forth, so as to achieve a desired combination of durability and flexibility thereof.

In some embodiments, the term "conveyance control system" refers to a computing entity that includes and/or is communicatively connected to one or more actuators of one or more conveyers of a conveyance line. A conveyance control system, for example, may include memory and one or more processors that are communicatively connected to a plurality of actuators configured to cause a directional movement of a one or more conveyers of the conveyance line. In some examples, a conveyance control system may include one or more wireless and/or wired communication interfaces that communicatively connect the conveyance control system to one or more external systems, such as the remote system and/or imaging system of the present disclosure. In this manner, the one or more external systems may provide control instructions to the conveyance control system to initiate a movement of a container positioned on the conveyance line.

In some embodiments, the term "remote system" refers to a computing system that is located remotely from the imaging system and communicatively connected to the imaging system via a wireless communication network. A remote system may include memory and one or processors that are configured to perform one or more operations of the present disclosure. The remote system may be associated with a conveyance line and may be communicatively connected to each of a plurality of imaging systems and control systems of the conveyance line. The remote system may be configured to receive a plurality of orders that may be fulfilled by the conveyance line, provide one or more control instructions to fulfill the orders, and monitor the progress of the orders through one or more data objects associated with the order. The data objects, for example, may include a container data object that may be associated with an order, a container selected to hold one or more objects identified by the order, and a container carrier configured to help the container move across the conveyance line. By way of example, the container data object may include an order identifier, a container identifier, a container carrier identifier, and/or one or more contextual attributes of the order, container, and container carrier. In some examples, the remote system may facilitate a container database that include a plurality of container data objects respectively corresponding to a plurality of orders that are facilitated by the conveyance line. In some examples, the remote system may retain the container data object within the container database to provide a record reflective of the fulfillment of an order by the conveyance line.

The remote system may include one of a plurality of computing systems within a computer ecosystem that is collectively configured to facilitate the fulfillment of an order. Each of the plurality of computing systems may be connected via one or more difference machine networks. A first machine network, for example, may include a wireless network that carries data between the remote system and an imaging system. The data, for example, may include container data (e.g., one or more portions of a container data object, etc.) indicating a container status, an order status for an order corresponding to a container, and/or the like. A second machine network may include a TCP device network configured between components of an imaging system (e.g., a PLC, an imaging device, a I/O master link, etc.). The second machine network may carry instructions (e.g., commands, messages, etc.) between the PLC, imaging device, and/or an IO link master using Ethernet/IP Protocol. In addition, or alternatively, the second machine network may carry image data from the imaging device to a user device via file transfer protocol. A third machine network may include an I/O link network that may carry data between the height detection sensor and the imaging device via the I/O master link.

Using the above machine networks, a remote system may communicate with an imaging system to facilitate the automated verification, validation, and fulfillment of an order received by the remote system.

In some embodiments, the term "order" refers to a data entity that describes a request for one or more objects that may be fulfilled using a conveyance line. In some examples, an order may describe an object type, a number of objects, and/or one or more contextual details, such as an end destination, user, usage instructions, and/or the like. As one example, using a clinical use case, an order may include a to-be filled prescription for a medication. In such a case, the order may describe a type of medication (e.g., pill capsules, etc.), a number of the medications (e.g., a number of pill capsules to be dispensed, etc.), intake instructions for using the medication, and/or the like.

In some embodiments, the term "container" refers to an object that is transported by a conveyance line. A container may depend on the use case and may include a package, box, bin, bottle, vial, and/or any other mechanism for carrying one or more items. In a clinical example, a conveyance line may include a production line configured to process medical prescriptions by dispensing pill capsules (e.g., items) into a pill vial (e.g., a container) labeled with prescription details associated with the pill capsules and/or an order for the pill capsules. In such a case, the pill vial may include a container that is transported across the conveyance line to move a group of items (e.g., pill capsules) from a dispensing station to a dispatching station.

In some examples, a container may be tracked as it is transported across the conveyance line using one or more transportation mechanisms. The transportation mechanisms, for example, may include a container carrier, or puck, that is configured to hold the container as the container is transported across the conveyance line. In some examples, the container carrier may include a radio frequency (RF)-controlled container that includes a preconfigured RF identifier (RFID) transmitter configured to transmit an RFID at a predetermined frequency. In such a case, the RFID of a container carrier may be associated with the container and then used to track the location of the container using one or more RFID readers positioned along the conveyance line.

In some embodiments, the term "container identifier" refers to a unique identifier that corresponds to a container.

A container identifier may include a string of unique characters and/or numbers corresponding to a container. In some examples, a container identifier may include and/or correspond to a container carrier associated with the container. The container carrier, for example, may include a RFID tag, barcode, and/or another scannable representation of an identifier. In some cases, the container identifier may include a unique identifier that corresponds to an RFID of a container carrier to allow for the tracking of the container through tracking the container carrier.

In some embodiments, the term "imaging location" refers to an imaging station within a conveyance line. A conveyance line may include a plurality of imaging locations. Each of the plurality of imaging locations may be associated with an imaging system. For example, the associated imaging system may be mounted above the imaging location. An imaging location may include a scanning device, an imaging system, and/or one or more conveyance controllers of the conveyance control system that are configured to stop a container at a particular location of the conveyance line, trigger one or more imaging operations for the container, and then route the container to another portion of the conveyance line based on the results of the one or more imaging operations.

In some examples, an imaging location may include an imaging center point. An imaging center point may include a point within the imaging location at which a container may be stopped. For example, a container may be stopped at the center point to ensure that the center point falls within an opening of the container. In this manner, a height detection sensor may be positioned above the imaging location and angled towards the center point to the measure a fill level of a container positioned within the imaging location.

In some embodiments, the term "imaging system" refers to one or more hardware and software components that are integrated into a structure configured to perform one or more imaging operations of the present disclosure. An imaging system, for example, May include memory and one or more processors that are communicatively connected to one or more hardware components configured to perform one or more imaging tasks of an enhanced imaging process. In some embodiments, an imaging system includes an imaging device, a height detection sensor, and an electrical panel. The electrical panel may include a programmable logic controller (PLC) and may communicatively connect (e.g., via one or more wired and/or wireless interfaces) the PLC to the imaging device and/or the height detection sensor. As described herein, the PLC may communicate, via the communication interfaces of the electrical panel, with the imaging device and the height detection sensor to perform one or more imaging tasks to generate a validation image of a container positioned at an imaging position of the conveyance line.

In some embodiments, the term "validation image" refers to a data entity that describes an image of a container. The validation image may include an image that is captured at an imaging location of a conveyance line. The validation image, for example, may be captured by an imaging system mounted relative to (e.g., above, etc.) the imaging location. In some examples, a plurality of validation images is captured by a plurality of different imaging systems positioned at various imaging locations of a conveyance line. Each validation image may correspond one of a plurality of containers that are moved across one or more imaging positions of a conveyance line.

A validation image may depict a container moved by a conveyance line. In some examples, the validation image may depict the contents of the container. For example, a validation image may include an overhead view of the container. In such a case, the quality of the validation image may depend on the fill level of the container and the focus level of the imaging system. For example, image quality may decrease or increase for a particular focus level as a function of the fill level of the container. By way of example, in a clinical context, the container may include a pill vial holding one or more pill capsules that fill the pill vial to a particular level based on the size and number of the pill capsules. In this example, a validation image may include an overhead image of an open pill vial (e.g., before the pill vial is sealed, capped, etc.) that depicts an overhead view of the pill bottle before the pill bottle is capped and dispatched for delivery to an end user, such as a pharmacy, individual, and/or the like. In order to capture fine details of the pills within the pill vial, the overhead image may be captured at a focus level configured to a fill level of the pill vial.

Traditional imaging techniques fail to account for varying fill levels of containers transported by a conveyance line. This leads to validation images with inconsistent image quality in conveyance lines that handle containers with various different fill levels. To address this technical challenge, some embodiments of the present disclosure provide an enhanced imaging system and adaptive imaging process that adaptively adjusts a focus level for a validation image based on fill level of a container.

In some embodiments, a validation image is associated with one or more image attributes that describe one or more contextual details of the contents within a container. Examples of image attributes may include a product type identifier and one or more physical production attributes. A clinical example of a product type identifier may be a drug type identifier (e.g., a National Drug Code (NDC) identifier, etc.) for an object, such as a pill capsule (e.g., assigned to a puck container, a pill bottle, etc. that is imaged by a validation image, etc.). A physical production attribute may describe any property associated with the production line item reflected by a validation image. Examples of physical production attributes include a pharmacy site location identifier associated with a pharmacy site of a production line item, a fill line number associated with a fill line of a production line item, a camera identifier for a camera device used to capture a validation image of a production line item, attributes describing one or more camera/flash settings for a camera device used to capture a validation image of a production line item, attributes describing date and/or time of capture of a validation image of a production line item, and/or the like.

In some embodiments, the term "imaging device" refers to an imaging component of an imaging system. An imaging device may include camera imaging hardware, such as one or more cameras, lights, and/or protective covers. The one or more cameras may include any type of camera, such as a Keyence VS series camera. The camera may include one or more camera lenses. In some examples, the camera lenses may include one or more protective covers. The protective covers may include one or more light diffusion filters, one applied inside, and one applied outside the protective lens covers. In some examples, the light diffusion filters may be cut from adhesive vinyl material designed to spread light to provide an even lit image without hotspots.

In some examples, an imaging device may include memory and one or more processors configured to locally execute one or more imaging instructions, capture a validation image, and process the validation image. The memory, for example, may store one or more internal inspection software. The internal inspection software may include one or more pretrained machine learning models that may be applied to a validation image to generate a classification score for the validation image. In some examples, the one or more pretrained machine learning models may include a categorical validation ensemble model that includes a plurality of validation category dependent model individually configured to generate a classification score for a validation image based on the fill level and/or one or more contextual attributes of the container corresponding the validation image, as described herein.

In some examples, the imaging device (e.g., the inspection software thereof) may be configured to generate an imaging response based on one or more imaging instructions. The imaging response may include an image classification (e.g., binary inspection result), a classification score (e.g., a defect level), an image name, and the validation image. The imaging response may be returned to the sender of the one or more imaging instructions, such as the PLC of the imaging system. In some examples, a first portion (e.g., image classification, image name, etc.) of the imaging response may be returned to the PLC and a second portion (e.g., the validation image, etc.) may be written to an FTP server associated with a user device. In such a case, the imaging instructions may be provided to a remote system via one or more communications from the PLC and the user device.

In some examples, the imaging device (e.g., the inspection software thereof) may be configured to adaptively control one or more imaging parameters of the camera based on the one or more imaging instructions. By way of example, the imaging device may store a plurality of calibrated focus levels that respectively correspond to a plurality of predefined fill level tiers of a container. In some examples, the one or more imaging instructions may identify one of the plurality of predefined fill level tiers and/or one of the plurality of calibrated focus levels. The imaging device may identify the predefined fill level tier and/or calibrated focus level, automatically modify a focus level of the camera, and capture an image at the focus level. In this manner, the imaging device may capture a validation image, using some of the techniques of the present disclosure, after adaptively modifying the focus of a camera based on attributes of a container.

In some embodiments, the term "height detection sensor" refers to a sensing component of the imaging system. The height detection sensor may include any type of sensing device configured to capture a distance reading measurement relative to the imaging device. The height detection sensor may include a single point distance sensor. The single point distance sensor, for example, may include a single point laser sensor, such as a laser triangulation sensor. By way of example, the height detection sensor may include a Keyence LR-200C laser distance sensor and/or any other type of laser distance sensor.

A height detection sensor may be configured to generate a distance reading measurement that identifies a height of the contents within a container. For example, a height detection sensor may be physically mounted to the imaging device at a fixed position to align the height detection sensor with the camera lens of the imaging device with respect to an expected position of a container underneath the camera lens. The imaging device may be mounted at an angle to point directly to an imaging center point of an imaging location.

The distance reading measurement may include a millimeter accurate, single point measurement of the distance from height detection sensor to the contents within a container. In some examples, the distance from the height detection sensor may be converted to a height of the contents relative to a pre-calibrated floor of the container. In this manner, the distance reading measurement may identify a height of the contents within the container. In a clinical example, the distance reading measurement may reflect a medication stack height of a plurality of pill capsules dispensed within a pill vial.

In some examples, the height detection sensor may be communicatively connected to the PLC of the imaging system. The height detection sensor may be configured to receive sensing instructions from the PLC and, in response to the sensing instructions, return a distance reading measurement to the PLC (e.g., via the input/output link with the PLC). As described herein, the PLC may receive the distance reading measurement and use the distance reading measurement to determine, in real time, a fill level of the container and, based on the fill level, adjust a focus level of the imaging device.

In some embodiments, the term "fixed mounting bracket" refers to a mechanical attachment that attaches a height detection sensor to the imaging device at a fixed position. The fixed mounting bracket may include a first attachment section connected to the height detection sensor, a second attachment section connected to the imaging device, and a joining section that connects the first attachment section and the second attachment section. The joining section may include a curved section such that the height detection sensor is held at an angle relative to the imaging device.

The first attachment section may include one or more (two, four, etc.) holes that align with one or more threaded holes on a side section of an exterior body of the height detection sensor. The height detection sensor may include a front end that includes a sensor lens, a back end that is opposite to the front end, and four side sections extending perpendicular from and connecting the front end to the back end. The first attachment section may cover at least a portion of one side section of the height detection sensor. The first attachment section may be connected to the height detection sensor by one or more screws that are inserted through the holes in the first attachment section and at least partially through the one or more threaded holes on the side section of the exterior body of the height detection sensor.

The second attachment section may include one or more (two, four, etc.) holes that align with one or more threaded holes on a side section of an exterior body of the imaging device. The imaging device may include a front end that includes a camera lens, a back end that is opposite to the front end, and a plurality of side sections that extend between the back end and the front end and form an L shaped camera housing. The L shaped camera housing may include an extended section that forms an intermediate exterior housing section between and extending parallel to the front and back end of the imaging device. In some examples, the second attachment section may be connected to the imaging device by one or more screws that are inserted through the holes in the second attachment section and at least partially through the one or more threaded holes on the intermediate exterior housing section of the exterior body of the imaging device.

In some examples, the fixed mounting bracket may include an adjustment handle. Once attached to the imaging device, adjustment handle may be used to collectively move both the imaging device and the height detection sensor as a single unit. In this way, a distance reading measurement from the height detection sensor may be leveraged to calibrate both the imaging device and the height detection sensor.

In some embodiments, the term "adjustable mounting bracket" refers to a mechanical attachment that attaches an imaging system (e.g., a connected height detection sensor and imaging device) at an adjustable position relative to an imaging location of a conveyance line. The adjustable mounting bracket may include an attachment platform that is attached (e.g., integrated with, etc.) to a back end of the imaging device. The attachment platform, for example, may be attached by one or more (e.g., four, etc.) screws inserted through one or more holes within the attachment platform and at least partially through one or more threaded holes on the back end of the imaging device.

The attachment platform may be attached to a conveyance line imaging station structure that extends overhead the imaging location. The attachment platform may include one or more clips, hooks, tracks, and/or the like that are compatible with the conveyance line imaging station structure. The attachment platform, using the one or more clips, hooks, tracks, and/or the like, may be moved relative to the conveyance line imaging station structure to adjust a position of the imaging system relative to an imaging location of a conveyance line.

In some examples, the conveyance line imaging station structure may include an aluminum structure that is modified to hold the imaging system, including the imaging device, height detection sensor, electrical panel, a user device (e.g., personal computer (PC)), PLC, and/or the like. In some examples, the imaging device (and/or height detection sensor) may be mounted at a height of 417 mm-420 mm above the conveyer deck at an imaging location of the conveyance line. The mounting height, for example, may be determined by a distance reading measurement detected by the height detection sensor. In some examples, the imaging device (and/or height detection sensor) may be mounted overhead a center point of an imaging location. For example, the imaging device (and/or height detection sensor) may be adjusted such that the height detection sensor points directly to the center point of the imaging position. Once mounted, the height detection sensor may be calibrated (e.g., zeroed, etc.) at a distance from the imaging system to a calibration pill vial placed underneath the imaging system.

In some embodiments, the term "electrical panel" refers to a power and communication interface between a plurality of components of the imaging system. The electrical panel may include a power distribution component (e.g., a breaker panel, etc.) and a communication interface. The power distribution component may include a circuit breaker with a plurality of electrical contacts and switches respectively connected to each of the components of the imaging system. The communication interface may include a plurality of input/output interfaces that communicatively connect each of the components of the imaging system. The communication interface may include a plurality of ethernet industrial protocol (Ethernet IP) interfaces that respectively connect each of the components of the imaging system. For example, the communication interface may include a panel-to-imaging device Ethernet IP that communicatively connects the imaging device to a PLC of the imaging system, a panel-to-I/O device Ethernet IP that communicatively connects the PLC of an I/O master link that is connected to the height detection sensor, among other interfaces.

In some embodiments, the term "programmable logic controller" or "PLC" refers to a controller of an electrical panel. The PLC may include memory and/or one or more processors configured to perform one or more operations of the present disclosure to adaptively capture images based on a fill level of a container. The PLC may include a PC-based automation controller, one or more network adapters, and an I/O link master controller. In some examples, the PLC may store computer-readable instructions configured to locally control the interactions between the imaging device, height detection sensor, and/or other components of the imaging system. In some examples, the PLC may be further configured to control interactions between the imaging system and one or more external systems, such as a conveyance control system, an RFID reader, a remote system, a user device, and/or the like.

By way of example, the PLC may be configured to receive sensor data from a height detection sensor. The sensor data may include a distance reading measurement that identifies a height of one or more objects placed within a container and may be relayed to the PLC via an I/O master link of the electrical panel. The PLC may leverage the sensor data to select one of a plurality of predefined calibrated focus levels for the imaging device and then provide imaging instructions to the imaging device that identify the selected focus level. The PLC may receive an imaging response from the imaging device based on the imaging instructions and provide the imaging response to one or more remote systems. For instance, the PLC may write a validated image from the imaging device to an FTP server. In addition, or alternatively, the PLC may locally store the imaging response, for example, as a result of a heartbeat anomaly.

In some embodiments, the term "presence data" refers to data that indicates the presence of an object at a particular location of a conveyance line. The presence data may include sensor data that is measured by one or more sensors positioned at a particular location. For instance, the presence data may include weight data measured by a weight sensor, photoelectric data measured by a photoelectric sensor, and/or the like. By way of example, the presence data may include feedback from a photoelectric sensor positioned at an imagining location along the conveyance line. The feedback, for example, may indicate that an object has entered an imaging station.

In some examples, the presence data is received from a photoelectric sensor placed on a conveyance line. The photoelectric sensor may detect the presence of a container within an imaging location of the conveyance line, generate presence data, and provide the presence data, via the electrical panel, to the PLC. The PLC may receive the presence data, generate scanning instructions, and provide the scanning instructions to a scanning device associated with the imaging location.

In some embodiments, the term "scanning instruction" refers to a computer-readable instruction, control signal, message, and/or any other mechanism configured to trigger an action by a scanning device. A scanning device, for example, may include a barcode scanner, an RFID reader, and/or the like. The scanning instruction may include an instruction, signal, message, and/or the like to trigger a scanning operation by the scanning device. In response to the scanning instruction, the scanning device may perform a scanning operation to read a barcode, RFID, and/or the like from a container and/or a container carrier associated with the container. For example, an RFID reader may record a RFID signal emitted by an RFID device within a container carrier. In some examples, the scanning device may perform the scanning operation and generate a scanning response to respond to the scanning instructions.

In some embodiments, the term "scanning response" refers to data generated in response to one or more scanning instructions. A scanning response, for example, may include barcode indicia, an RFID signal, and/or the like. A scanning response may be reflective of an identifier for a container and/or a container carrier associated with a container. For example, a scanning response may include an RFID corresponding to container carrier that is electronically associated with and physically carries a container.

In some examples, the scanning device may perform a scanning operation and generate a scanning response in response to the scanning instructions received from a PLC. The scanning device may respond to the scanning instructions by returning a scanning response to the PLC. In this manner, the PLC may receive an identifier that corresponds to a container within an imaging location. In some examples, the identifier may correspond to a container data object that represents the container.

In some embodiments, the term "container data object" refers to a data entity that represents a container. A container data object may include a plurality of container attributes, including one or more order attributes (e.g., pill capsule size, number of pill capsules, an expected fill level, etc.) associated with an order corresponding to the container, one or more carrier attributes (e.g., RFID, etc.) associated with a container carrier of the container, and/or the like. In some examples, the container data object may include one or more conveyance attributes associated with one or more events along the conveyance line. By way of example, a container data object may include and/or be associated with one or more verification events.

In some embodiments, the term "container database" refers to a data structure maintained by a remote system that stores a plurality of container data objects. A container database may include any type of storage data structure, including a relational database, a linked list, a graph-based data structure, and/or the like. A container database may be persisted by the remote system, which may generate a container data object, store the container data object within the container database, continually modify the container data object as a corresponding container is moved across a conveyance line, and retain the container data object within the container database for a period of time after the container is taken off the conveyance line (e.g., to be shipped, etc.).

In some embodiments, the term "queued container data object" refers to a data entity that represents a container and is locally stored within a local object queue buffer within memory of the PLC. A queued container data object may include a duplicate and/or a portion of a container data object stored within a container database. A queued container data object may be preloaded to the local object queue buffer of the PLC in response to an availability of space within the local object queue buffer.

In some embodiments, the term "local object queue buffer" refers to a data structure maintained by a PLC that stores a plurality of queued container data objects. A local object queue buffer may include any type of storage data structure, including a relational database, a linked list, a graph-based data structure, a queue, stack, and/or the like. For example, the local object queue buffer may include a first-in, first-out (FIFO) queue, and/or the like. In some examples, the local object queue buffer may temporarily store a plurality of queued container data objects that represent a plurality of containers enroute to an imaging system of the conveyance line. For example, the local object queue buffer may include a plurality of queued container data objects representing a list of containers routed to the imaging system. Each queued container data object may include container data (e.g., qualification criteria, an expected fill level of the container, and object type within container, etc.) that may be used to locally process a validation image of the container.

The local object queue buffer may include a maximum buffer length. In some examples, the maximum buffer length may be based on one or more hardware constraints of the PLC. By way of example, the local object queue buffer may have a maximum buffer length of 99 queued container data objects. In some examples, the local object queue buffer may be automatically updated by the remote system in response to one or more routing instructions configured to route a container to an imaging system. In addition, or alternatively, the local object queue buffer may be updated in response to a buffer availability message (e.g., after a container is processed by the imaging system).

In some embodiments, the term "buffer availability message" refers to a computer-readable instruction, control signal, message, and/or any other mechanism configured to request container data for a container routed to an imaging system. In some examples, a buffer availably message may be provided to a remote system in response to a completion of one or more imaging operations. In addition, or alternatively, a buffer availability message may reflect a buffer status of the local object queue buffer and may be provided at a predetermined timing interval.

In some embodiments, the term "qualification criteria" refers to a data entity that describes one or more imaging constraints for a container. In some examples, the qualification criteria may define an order requirement for a container. For example, the qualification criteria may restrict imaging operations to containers that are associated with an order. In some examples, qualification criteria may be satisfied by receiving a container identifier (e.g., via an RFID scan of the container carrier associated with the container), identifying a container data object and/or queued container data object corresponding to the container identifier, and identifying an order associated with the container.

In some embodiments, a validation image may be captured for a container that satisfies the qualification criteria. In the event that a container doesn't satisfy the qualification criteria, the container may not be routed from the imaging location without a validation image.

In some embodiments, the term "distance reading measurement" refers to a data value that is output by a height detection sensor. A distance reading measurement, for example, may include a millimeter accurate, single point, distance measurement between one or more sensor lenses of the height detection sensor and one or more objects (e.g., a stack of pill capsules, etc.) within a container. For example, in a clinical use case, a distance reading measurement may reflect a millimeter distance between the height detection sensor and a surface of a plurality of pill capsules dispensed within a pill vial.

In some examples, the height detection sensor may be calibrated using a calibration container (e.g., by zeroing the height detection sensor on a floor of an empty container, etc.). By doing so, the height detection sensor may generate a height measurement that indicates a distance between the floor of a container and a surface of one or more objects within the container. In this manner, a height detection sensor may reflect a height of one or more objects within a container.

In some examples, a distance reading measurement may be triggered to initiate an adaptive imaging process.

In some embodiments, the term "relative distance measurement" refers to a data value that describes a proportion of a container that is filled with one or more objects. A relative distance measurement, for example, may reflect a percentage of a container that is filled by a plurality of objects. By way of example, the relative distance measurement may be identified by dividing the distance reading measurement by a height of a container (e.g., as reflected by a container data object, queued container data object, etc.). In a clinical example, the container height may be 77 mm for a pill vial and a relative distance measurement may include a percentage of the pill vial that is filled by one or more pill capsules.

In some embodiments, the term "measured fill level" refers to a predefined data value that is determined from a predefined fill level tier based on the relative distance measurement. For example, a measured fill level may be one of a plurality of predefined fill level tiers. The measured fill level may include a predefined fill level tier that associated with a fill level range that includes the relative distance measurement.

In some embodiments, the term "predefined fill level tier" refers to one of a plurality of predefined fill level tiers that describe one or more fill level ranges for a container. Each of the predefined fill level tiers, for example, may define a non-overlapping fill level range. A fill level range may include a range of distance reading measurements, relative distance measurements, and/or the like. By way of example, a first predefined fill level tier may include range of 0-25%, a second predefined fill level tier may include a range of 26-50%, a third predefined fill level tier may include a range of 51-75%, and a fourth predefined fill level tier may include a range of 76-100%.

In some embodiments, the term "focus level" refers to a set of camera settings that are used, by an imaging device, to capture an image. A focus level, for example, may include a combination of one or more lighting parameters, lens aperture parameters, and/or the like. In some examples, a focus level includes a preconfigured set of camera settings that correspond to a fill level of a container. For example, the focus level may be one of a plurality of calibrated focus levels that are locally stored by the imaging device.

In some embodiments, the term "calibrated focus level" refers to one of a plurality of calibrated focus levels that is preconfigured for an imaging system. Each of the plurality of calibrated focus levels, for example, may include a set of camera settings that are optimized for a particular fill level of a container. By way of example, the plurality of calibrated focus levels may respectively correspond to a plurality of predefined fill level tiers.

In some embodiments, the term "imaging instruction" refers to a computer-readable instruction, control signal, message, and/or any other mechanism configured to trigger an action by an imaging device. An imaging instruction, for example, may include one or more instructions and/or commands that are provided to an imaging device to trigger a validation image at a particular focus level. In some examples, one or more imaging instructions may be provided to the imaging device by a PLC. The imaging instructions may include data indicative of the measured fill level of the container. For instance, the imaging instructions may identify one of the plurality of predefined fill level tiers. In addition, or alternatively, the imaging instructions may identify one of the plurality of calibrated focus levels.

In some examples, the imaging instructions may include contextual data associated with an imaging operation. For example, the imaging instruction may identify an image name for the validation image, an object type associated with the container, and/or the like.

In some examples, a sequence of imaging instructions may be provided to sequentially perform one or more operations of an adaptive imaging process. For example, the PLC may provide a first imaging instruction that defines a binned level of focus (e.g., a number identifying one of the plurality of calibrated focus levels) that is to be used ahead of an image capture trigger via Ethernet IP. The PLC may then provide a second imaging instruction configured to trigger a soft event indicating the imaging system is OK to use the data. The PLC may provide a third imaging instruction indicating a file name of the image that is to be saved. The PLC may provide a fourth imaging instruction configured to trigger the imaging process based on the binned level of focus.

In some embodiments, the term "imaging response" refers to data generated in response to one or more imaging instructions. An imaging response may include a validation image and contextual data associated with the validation image. In some examples, the contextual data may include one or more classifications for the validation image. For instance, the imaging response may include the validation image, an image classification, a classification score, an image name, and a measured fill level of the container.

In some examples, the imaging device may provide at least a portion of the imaging response to the PLC. In addition, or alternatively, the imaging device may provide at least a portion of the imaging response to a user device. For example, the imaging device may provide the image classification, the classification score, and/or the image name to the PLC. In addition, or alternatively, the imaging device may provide the validation image and the image name to the user device. For example, the validation image may be written to an FTP server directly from the imaging device.

In some embodiments, the term "image classification" refers to a data entity that describes a binary classification indicative whether a validation image corresponds to a validation category associated with the imaged container. In some examples, an image classification may be based on a classification score for the validation image. The image classification, for example, may include a positive classification (e.g., "1") in the event that a classification score satisfies a classification threshold (e.g., 80%, 90%, 95%, etc.). In addition, or alternatively, the image classification may include a negative classification (e.g., "0") in the event that a classification score fails to satisfy the classification threshold.

In some embodiments, the term "classification score" refers to a machine learning output generated by a categorical validation ensemble model based on an input image. A classification score, for example, may include a validation prediction that describe a likelihood that a corresponding validation image reflects an object associated with a validation category that is associated with the container. The classification score may include a numerical range, a ratio, a percentage, and/or the like. In some examples, the classification score may include a number between zero and one. In some embodiments, a classification score includes a smoothed likelihood that the validation image reflects a validation category.

In some embodiments, the term "validation category" refers to a data entity that describes a category defined by a subset of image attributes. For example, a validation category may correspond to one or more expected attributes of an object that is located within a container. By way of example, in a clinical example, a validation category may correspond to a particular drug type identifier (e.g., NDC), a particular drug type identifier and a particular pharmacy site location identifier, a particular drug type identifier, a particular pharmacy site location identifier, and a particular fill level, and/or any other combination of one or more defined image attributes.

In some embodiments, the term "categorical validation machine learning model" refers to a data entity that is configured to describe parameters, hyper-parameters, and/or defined operations of a machine learning model that is configured to determine whether an input image corresponds to a target validation category. In some embodiments, the categorical validation machine learning model is configured to process at least one of the input images (e.g., as a matrix), extracted image-based features values associated with the input image (e.g., as a vector), and/or one or more physical production attributes for the input image (e.g., as a vector), in order to determine a classification score for the input image that describes whether the input image corresponds to a target validation category.

In some embodiments, the categorical validation machine learning model includes a convolutional neural network, such as a binary classification convolutional neural network, that is characterized by at least one (i) five layers including four two-dimensional convolutional layers and one flattening layer, (ii) filters that are increased across the two-dimensional convolutional layers to capture patterns and details in the input image, and/or (iii) each 2-dimensional convolutional layer utilizes a rectified linear unit (ReLU) activation function. In some embodiments, each two-dimensional convolution operation in a two-dimensional convolutional layer is followed by a pooling operation (e.g., with a size and stride of two), where dropout values are increased across two dimensional convolutional layers to a maximum value (e.g., a maximum value of 0.7). In some embodiments, the categorical validation machine learning model is trained using a binary cross-entropy loss function, with constant label smoothing (e.g., constant label smoothing at 0.1 to train the model with mislabeled data and with improved overall robustness and accuracy). In some embodiments, to train the categorical validation machine learning model, an optimization function such as Adam Optimizer function or a Stochastic gradient descent optimizer function is utilized. While various embodiments of the present disclosure describe that the categorical validation machine learning model includes a convolutional neural network, a person of ordinary skill in the relevant technology will recognize that any machine learning model (e.g., any neural network, such as any pre-trained neural network) may be utilized as part of the categorical validation machine learning model.

In some embodiments, the term "categorical validation ensemble model" refers to a plurality of categorical machine learning models. A categorical validation ensemble model, for example, may include a separate categorical machine learning model for each validation category associated with a conveyance line. In some examples, for a pharmaceutical production line, a categorical validation ensemble model may include a separate categorical machine learning model for each NDC of a plurality of NDCs processed by the pharmaceutical production line.

In some embodiments, the term "verification event" refers to a data entity that describes an event that is executed on a conveyance line. A verification event, for example, may describe an iteration of an imaging process for a container. For example, a verification event may store a plurality of contextual attributes identified during the performance of the imaging process. By way of example, the verification event may include the labeled validation image (e.g., labeled by the image name), an image classification, a classification score, and/or one or more height measurements for the contents of a container. The one or more height measurements, for example, may include an expected fill level (e.g., calculated based on a volume of the container, a number of objects, and a size of the objects, etc.), a measured fill level, a relative distance measurement, and/or a distance reading measurement for a container.

In some embodiments, the term "imaging system heartbeat message" refers to a periodic message provided by the imaging system to one or more connected systems. For example, an imaging system heartbeat message may be provided by a PLC to a remote system wirelessly connected to the imaging system. The imaging system heartbeat message may include a network message transmitted to the remote system that identifies the imaging system (e.g., via a shared identifier, etc.). The imaging system heartbeat message may be provided at a defined heartbeat interval to confirm a wireless connection between the imaging system and the remote system.

In some embodiments, the term "remote system heartbeat message" refers to a periodic message provided by the remote system to one or more connected systems. For example, a remote system heartbeat message may be provided to a PLC by the remote system. The remote system heartbeat message may include a network message transmitted to the imaging system that identifies the remote system (e.g., via a shared identifier, etc.). The remote system heartbeat message may be provided at a defined heartbeat interval to confirm a wireless connection between the imaging system and the remote system.

In some embodiments, the term "defined heartbeat interval" refers to a heartbeat frequency of one or more heartbeat messages exchanged between connected systems within a computing ecosystem. In some examples, an imaging system heartbeat message may be provided at a first defined heartbeat interval (e.g., five minutes, one hour, etc.) and a remote system heartbeat message may be provided at a second defined heartbeat interval (e.g., five minutes, one hour, etc.). The first and second defined heartbeat interval may be the same or different.

In some embodiments, the term "heartbeat anomaly" refers to a connection error that is identified using one or more exchanged heartbeat messages. For instance, a heartbeat anomaly may be identified in the event that one or more heartbeat messages are not received within a defined heartbeat interval. For example, heartbeat messages from a remote system (and/or PLC) may be monitored by a PLC (and/or the remote system). In the event that a heartbeat message is received within a defined interval, a heartbeat anomaly may not be identified, and data may be provided to the remote system in accordance with one or more operations of the present disclosure. In the event that the heartbeat message is not received, a heartbeat anomaly exception is thrown, and an online anomaly recovery process may be triggered in response to a heartbeat anomaly exception.

An online anomaly recovery process may include a sequence of suboperations. For example, a PLC may generate a connection loss alarm and provide the connection loss alarm to a user device to notify a user. In addition, or alternatively, validation images may be stored in a local image buffer with a connection loss alarm tag.

In some examples, imaging operations may be continued after a heartbeat anomaly using one or more local buffers. For example, the PLC may access a local object queue buffer to receive information (e.g., a queued container data object)

for a container that is loaded in at an imaging location. The imaging system may perform an adaptive imaging process to generate a verification event for the next queued container object and store the verification event in a local image buffer. In response to a remote system heartbeat message from remote system, the PLC may synchronize the image buffer with the remote system. In response to a continued heartbeat anomaly (e.g., an absence of a remote system heartbeat message), the imaging system may process another container using the local object queue buffer until the local object queue buffer is empty. If empty, the adaptive imaging process may be halted.

In some embodiments, the term "elapsed time" refers to a measure of time after the reception of a heartbeat message.

In some embodiments, the term "connection loss alarm tag" refers to a data entity that identifies a loss of connection between an imaging system and a remote system. A connection loss alarm tag may be stored with a validation image, a verification event, and/or like.

In some embodiments, the term "local image buffer" refers to a portion of memory of the PLC that may temporarily store a plurality of validation images, verification events, and/or any other data generated during an adaptive imaging process.

In some embodiments, the term "conveyance line operation instruction" refers to a computer-readable instruction, control signal, message, and/or any other mechanism configured to trigger an action by a conveyance control system. In some examples, a conveyance line operation instruction may be generated using a process control database.

In some embodiments, the term "process control database" refers to a set of one or more data entities (e.g., a set of data entities stored in a distributed manner) that contain data for a database that describes one or more prediction-based actions and/or action thresholds. The prediction-based actions and/or action thresholds may correspond to an image classification.

For example, the process control database may describe, for each validation category of a set of defined validation categories, an action threshold for the validation category and the one or more process control parameters for the validation category, where the action threshold for the validation category may describe a condition that, when satisfied by the image classification with respect to the validation category, causes performance of one or more control actions based on one or more process control parameters associated with the validation category. An action threshold, for example, may recommend that, when an image classification for a validation image with respect to a corresponding validation category exceeds a particular numeric value, the one or more control actions for the corresponding validation category should be performed. As another example, the action threshold may recommend that, when a validation prediction for a validation image with respect to a corresponding validation category falls below a particular numeric value, the one or more control actions for the corresponding validation category should be performed.

In some embodiments, the term "routing action" refers to an action performed by a conveyance line in response to a conveyance line operation instruction. A routing action may include a halting action to halt the movement of at least a portion of containers located at a portion of the conveyance line. In addition, or alternatively, a routing action may include a container routing action to move a container to a particular location of the conveyance line.

For example, a routing action may include one or more control operations for controlling a motor (and/or other control mechanism) of a conveyance assembly to initiate a movement of a container from an origin location to a destination location. A routing action may include a movement of a conveyer belt to move a container in a forward direction. In addition, or alternatively, a routing action may include a movement of one or more diverting assemblies to reroute a container on a conveyance assembly.

In some examples, a first routing action may be performed in response to a negative image classification to divert a container. In addition, or alternatively, a second routing action may be performed in response to a positive image classification. For example, the second routing action may include a clearance action that moves a container in a forward direction without rerouting the container for further inspection. A clearance action, for example, may include a pass routing action allowing the container to proceed.

In some examples, a second routing action may divert a container for further inspection. An image review action, for example, may include a minor routing action which allows the container to be verified based on the validation image. For example, a process control action may be triggering an exception that causes a user interface depicting the validation image as well as the physical production attributes of the validation image to be presented to the human inspector.

In some examples, a third routing action may divert a container for further manual inspection. A manual inspection action, for example, may include a major routing action which requires a manual verification of the contents in a container. A manual inspection action may include triggering an exception that causes a container associated with a validation image to be diverted to a human inspector. A manual inspection action may be triggering an exception that causes a container associated with a validation image to be diverted to a human inspector and a user interface depicting the validation image to be presented to the human inspector.

IV. OVERVIEW AND TECHNICAL IMPROVEMENTS

Various embodiments of the present disclosure provide improved imaging systems and techniques for adaptively imaging objects with one or more different attributes.

Traditional imaging systems capture images using one or more calibrated camera settings to enhance the quality of the image. Ultimately, the quality of an image is dependent on the correlation between the camera settings (e.g., a focus level) and the attributes of an object. This leads to variations in image quality in systems that fail to adapt their camera settings to the objects being imaged. To enhance image quality on an object-to-object basis, the imaging systems of the present disclosure may include mounted sensing devices, such as height detection sensors, that receive sensor data reflective of the attributes of an object. This sensor data may be applied in an improved imaging technique to adaptively calibrate the focus level of an imaging device to the individual characteristics of an object. By doing so, the systems and techniques of the present disclosure may improve imaging technology by enhancing the consistency of image quality. In some examples, these improvements may be integrated with a conveyance line to improve the continuous verification of items moved across the conveyance line.

In some embodiments of the present disclosure, improved imaging techniques may be provided that enable the asynchronous image capture, verification, and error tracking of a networked imaging systems. For example, some of the techniques of the present disclosure provide a new error tracking and handling process that leverages asynchronous image capture and verification capabilities to detect and handle communication errors without impacting throughput of a conveyance line. The error tracking and handling technique may employ heartbeat tracking mechanisms to continuously monitor a connection between an imaging system and one or more networked systems. Imaging tasks are buffered at the imaging system such that, in the event of a loss of connection, the imaging system may asynchronously continue to capture images for a duration of time while the connected system is debugged. By doing so, the techniques of the present disclosure may improve imaging technology by enhancing the reliability and error tolerance of imaging systems. In some examples, these improvements may be integrated with a conveyance line to improve the continuous verification of items moved across the conveyance line.

Examples of technologically advantageous embodiments of the present disclosure include: (i) improved imaging systems configured to adaptively calibrate an imaging device to detected attributes of an object, (ii) improved imaging techniques for adaptively imaging an object, (iii) asynchronous image capture and verification techniques, among other aspects of the present disclosure. Other technical improvements and advantages may be realized by one of ordinary skill in the art.

V. EXAMPLE SYSTEM OPERATIONS

As indicated, various embodiments of the present disclosure make important technical contributions to networked imaging system. In particular, systems and methods are disclosed herein that implement an asynchronous imaging process that leverages heartbeat mechanisms to detect and handle errors in a network connection between networked devices. By doing so, some of the techniques of the present disclosure improve the performance of imaging systems in general and, specifically, for continuous image-based verification processes such as those employed on a conveyance line.

Figure 4:
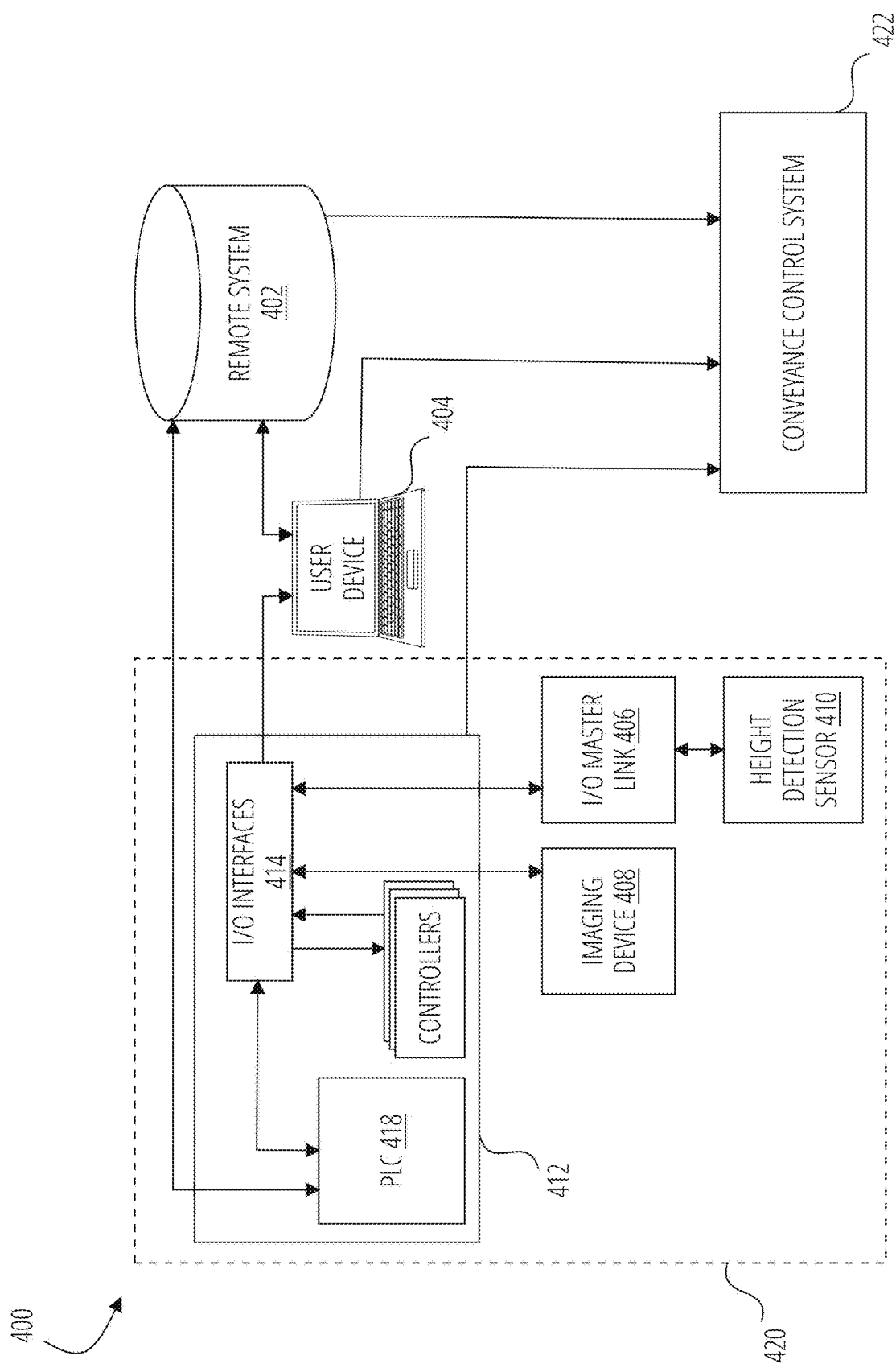
FIG. 4 is an example computing ecosystem showing example computing systems for performing an image verification process in accordance with some embodiments discussed herein.

FIG. 4 is an example computing ecosystem 400 showing example computing systems for performing an image verification process in accordance with some embodiments discussed herein. The computing ecosystem 400 includes an imaging system 420, a user device 404, a remote system 402, and a conveyance control system 422. In some examples, the imaging system 420, the user device 404, the remote system 402, and/or the conveyance control system 422 may collectively facilitate the operations of a conveyance line in which a plurality of objects are dispensed and transported to fulfill a plurality of orders. In some examples, the conveyance line may transport a plurality of regulated objects, such as pill capsules in a clinical context, that may be monitored at one or more points of the conveyance line to ensure compliance with one or more regulations, safety standards, and/or the like.

In some embodiments, the conveyance line is a component of a fulfillment system that is configured to move (e.g., through friction or other forces) items, containers, container carriers, and/or the like to, from, and/or between one or more locations within the fulfillment system. In some examples, a conveyance line may include an assembly, arrangement, system, and/or the like that includes a plurality of conveyers. In some examples, a conveyance line may include an end-to-end closed conveyance line that is configured to transport (e.g., move, route, etc.) a plurality of objects (e.g., containers, container carriers, combinations thereof, etc.) between one or more points within the fulfillment system. The conveyance line may include a plurality of at least partially connected portions, each configured to move a plurality of objects (e.g., containers, container carriers, combinations thereof, etc.) to, from, and/or between multiple points within the fulfillment system.

The conveyance line may be configured to move, via a plurality of connected conveyers, an object (e.g., a container, container carrier, etc.) between one or more stations within a fulfillment system. The plurality of stations may include dispensing stations (and/or filling, packing, etc. stations) for placing objects within a container (e.g., a pill vial, a package, etc.), imaging stations for verifying the contents of a container, among other types of stations designed to accurately fulfill an order. In some examples, one or more imaging stations may include imaging locations along the conveyance line that are associated with an imaging system 420 configured to validate the contents within a container as the container is moved across the fulfillment system.

In some embodiments, a conveyer is a component of the conveyance line. A conveyer may include one or more moving surfaces (e.g., one or more belts, one or more rollers, etc.), which may exert one or more directional forces on one or more objects placed on the conveyer. In some examples, a conveyer may be controlled by a conveyance control system 422. It should be understood that a conveyer or conveyer belt, as described herein, may be configured as a conventional conveyer belt, such that it is formed and/or extended around at least two driving wheels. By turning the driving wheels, the conveyer belt may run cyclically (e.g., continuously around the driving wheels). The conveyer belt may thus, like conventional belts of this nature, be made from a multitude of materials, linkages, and so forth, so as to achieve a desired combination of durability and flexibility thereof.

In some embodiments, the conveyance control system 422 is a computing entity that includes and/or is communicatively connected to one or more actuators of one or more conveyers of a conveyance line. A conveyance control system 422, for example, may include memory and one or more processors that are communicatively connected to a plurality of actuators configured to cause a directional movement of a one or more conveyers of the conveyance line. In some examples, a conveyance control system 422 may include one or more wireless and/or wired communication interfaces that communicatively connect the conveyance control system 422 to one or more external systems, such as the remote system 402 and/or imaging system 420 of the present disclosure. In this manner, the one or more external systems may provide control instructions to the conveyance control system 422 to initiate a movement of a container positioned on the conveyance line.

The conveyance control system 422 may operate to route a container, a container carrier, and/or the like to/from one or more stations of the conveyance line to fulfill an order. An order may include a data entity that describes a request for one or more objects that may be fulfilled using the conveyance line. In some examples, an order may describe an object type, a number of objects, and/or one or more contextual details, such as an end destination, user, usage instructions, and/or the like. As one example, using a clinical use case, an order may include a to-be filled prescription for a medication. In such a case, the order may describe a type of medication (e.g., pill capsules, etc.), a number of the medications (e.g., a number of pill capsules to be dispensed, etc.), intake instructions for using the medication, and/or the like.

In some examples, an order may be fulfilled by dispensing an ordered object (e.g., a set of pill capsules, etc.) to a container. In some embodiments, the container is an object that is transported by a conveyance line. A container may depend on the use case and may include a package, box, bin, bottle, vial, and/or any other mechanism for carrying one or more items. In a clinical example, a conveyance line may include a production line configured to process medical prescriptions by dispensing pill capsules (e.g., items) into a pill vial (e.g., a container) labeled with prescription details associated with the pill capsules and/or an order for the pill capsules. In such a case, the pill vial may include a container that is transported across the conveyance line to move a group of items (e.g., pill capsules) from a dispensing station to a dispatching station.

In some examples, a container may be tracked as it is transported across the conveyance line using one or more transportation mechanisms. The transportation mechanisms, for example, may include a container carrier, or puck, that is configured to hold the container as the container is transported across the conveyance line. In some examples, the container carrier may include a radio frequency (RF)-controlled container that includes a preconfigured RF identifier (RFID) transmitter configured to transmit an RFID at a predetermined frequency. In such a case, the RFID of a container carrier may be associated with the container and then used to track the location of the container using one or more RFID readers positioned along the conveyance line.

In some examples, to better verify the accuracy of an order that is transported using container, the conveyance control system 422 may route a plurality of transported containers across one or more imaging locations in which an imaging system 420 may capture a validation image of the contents within the containers for validation purposes.

In some embodiments, an imaging location is an imaging station within a conveyance line. A conveyance line may include a plurality of imaging locations. Each of the plurality of imaging locations may be associated with an imaging system 420. For example, the associated imaging system 420 may be mounted above the imaging location. An imaging location may include a scanning device, an imaging system 420, and/or one or more conveyance controllers of the conveyance control system 422 that are configured to stop a container at a particular location of the conveyance line, trigger one or more imaging operations for the container, and then route the container to another portion of the conveyance line based on the results of the one or more imaging operations.

In some examples, an imaging location may include an imaging center point. An imaging center point may include a point within the imaging location at which a container may be stopped. For example, a container may be stopped at the center point to ensure that the center point falls within an opening of the container. In this manner, a height detection sensor 410 may be positioned above the imaging location and angled towards the imaging center point the measure a fill level of a container positioned within the imaging location. As described herein, the fill level may be leveraged to improve the quality of validation images captured by the imaging system 420.

In some embodiments, the imaging system 420 includes one or more hardware and software components that are integrated into a structure configured to perform one or more imaging operations of the present disclosure. The imaging system 420, for example, may include memory and one or more processors that are communicatively connected to one or more hardware components configured to perform one or more imaging tasks of an enhanced imaging process. In some embodiments, the imaging system 420 includes an imaging device 408, a height detection sensor 410, and an electrical panel 412. The electrical panel 412 may include a PLC 418 and may communicatively connect (e.g., via one or more wired and/or wireless interfaces) the PLC 418 to the imaging device 408 and/or the height detection sensor 410. As described herein, the PLC 418 may communicate, via the input/output (I/O) interfaces 414 of the electrical panel 412, with the imaging device 408 and the height detection sensor 410 to perform one or more imaging tasks to generate a validation image of a container positioned at an imaging position of the conveyance line.

As shown in FIG. 4, the imaging system 420 includes an imaging device 408, a height detection sensor 410, and a PLC 418. In some examples, the height detection sensor 410 includes a single point laser sensor. The PLC 418 may be disposed on an electrical panel 412 that is communicatively connected to the imaging device 408 and the height detection sensor 410 by one or more I/O interfaces 414. The PLC 418 may include memory. A plurality of calibrated focus levels may be stored within the memory. As described herein, the PLC 418 may leverage the plurality of calibrated focus levels to initiate an adaptive imaging process. In response to the adaptive imaging process, the PLC 418 may receive a validation image, an image classification, a classification score, and/or an image name from the imaging device 408. In some examples, the PLC 418 may provide an imaging response including the validation image, the image classification, the classification score, the image name, and/or the sensor data from the height detection sensor 410 to the remote system 402 for validating an order.

In some embodiments, the imaging device 408 is an imaging component of the imaging system 420. The imaging device 408 may include camera imaging hardware, such as one or more cameras, lights, and/or protective covers. The one or more cameras may include any type of camera, such as a Keyence VS series camera. The camera may include one or more camera lenses. In some examples, the camera lenses may include one or more protective covers. The protective covers may include one or more light diffusion filters, one applied inside, and one applied outside the protective lens covers. In some examples, the light diffusion filters may be cut from adhesive vinyl material designed to spread light to provide an even lit image without hotspots.

In some examples, the imaging device 408 may include memory and one or more processors configured to locally execute one or more imaging instructions, capture a validation image, and process the validation image. The memory, for example, may store internal inspection software. The internal inspection software may include one or more pre-trained machine learning models that may be applied to a validation image to generate a classification score for the validation image. In some examples, the one or more pretrained machine learning models may include a categorical validation ensemble model that includes a plurality of validation category dependent model individually configured to generate a classification score for a validation image based on the fill level and/or one or more contextual attributes of the container corresponding the validation image, as described herein.

In some examples, the imaging device 408 (e.g., the inspection software thereof) may be configured to generate an imaging response based on one or more imaging instructions. The imaging response may include an image classification (e.g., binary inspection result), a classification score (e.g., a defect level), an image name, and/or the validation image. The imaging response may be returned to the sender of the one or more imaging instructions, such as the PLC 418 of the imaging system 420. In some examples, a first portion (e.g., image classification, image name, etc.) of the imaging response may be returned to the PLC 418 and a second portion (e.g., the validation image, etc.) may be written to an FTP server associated with a user device 404. In such a case, the imaging instructions may be provided to a remote system 402 via one or more communications from the PLC 418 and the user device 404.

In some examples, the imaging device 408 (e.g., the inspection software thereof) may be configured to adaptively control one or more imaging parameters of the camera based on the one or more imaging instructions. By way of example, the imaging device 408 may store a plurality of calibrated focus levels that respectively correspond to a plurality of predefined fill level tiers of a container. In some examples, the one or more imaging instructions may identify one of the plurality of predefined fill level tiers and/or one of the plurality of calibrated focus levels. The imaging device 408 may identify the predefined fill level tier and/or calibrated focus level, automatically modify a focus level of the camera, and capture an image at the focus level. In this manner, the imaging device 408 may capture a validation image, using some of the techniques of the present disclosure, after adaptively modifying the focus of a camera based on attributes of a container.

In some embodiments, the height detection sensor 410 is a sensing component of the imaging system 420. The height detection sensor 410 may include any type of sensing device configured to capture a distance reading measurement relative to the imaging device 408. The height detection sensor 410 may include a single point distance sensor. The single point distance sensor, for example, may include a single point laser sensor, such as a laser triangulation sensor. By way of example, the height detection sensor 410 may include a Keyence LR-200C laser distance sensor and/or any other type of laser distance sensor.

The height detection sensor 410 may be configured to generate a distance reading measurement that identifies a height of the contents within a container. For example, a height detection sensor 410 may be physically mounted to the imaging device 408 at a fixed position to align the height detection sensor 410 with the camera lens of the imaging device 408 with respect to an expected position of a container underneath the camera lens. The imaging device 408 may be mounted at an angle to point directly to an imaging center point of an imaging location.

The distance reading measurement may include a millimeter accurate, single point measurement of the distance from the height detection sensor 410 to the contents within a container. In some examples, the distance from the height detection sensor 410 may be converted to a height of the contents relative to a pre-calibrated floor of the container. In this manner, the distance reading measurement may identify a height of the contents within the container. In a clinical example, the distance reading measurement may reflect a medication stack height of a plurality of pill capsules dispensed within a pill vial.

In some examples, the height detection sensor 410 may be communicatively connected to the PLC 418 of the imaging system 420 via an I/O master link 406. The height detection sensor 410 may be configured to receive sensing instructions from the PLC 418 and, in response to the sensing instructions, return a distance reading measurement to the PLC 418 (e.g., via the I/O interfaces 414 with the PLC 418). As described herein, the PLC 418 may receive the distance reading measurement and use the distance reading measurement to determine, in real time, a fill level of the container and, based on the fill level, adjust a focus level of the imaging device 408.

In some embodiments, the PLC 418 is a controller of an electrical panel 412. The PLC 418 may include memory and/or one or more processors configured to perform one or more operations of the present disclosure to adaptively capture images based on a fill level of a container. The PLC 418 may include a PC-based automation controller, one or more network adapters, and an I/O link master controller. In some examples, the PLC 418 may store computer-readable instructions configured to locally control the interactions between the imaging device 408, height detection sensor 410, and/or other components of the imaging system 420. In some examples, the PLC 418 may be further configured to control interactions between the imaging system 420 and one or more external systems, such as a conveyance control system 422, an RFID reader, the remote system 402, a user device 404, and/or the like.

By way of example, the PLC 418 may be configured to receive sensor data from the height detection sensor 410. The sensor data may include a distance reading measurement that identifies a height of one or more objects placed within a container and may be relayed to the PLC 418 via the I/O master link 406 of the electrical panel 412. The PLC 418 may leverage the sensor data to select one of a plurality of predefined calibrated focus levels for the imaging device 408 and then provide imaging instructions to the imaging device 408 that identify the selected focus level. The PLC 418 may receive an imaging response from the imaging device 408 based on the imaging instructions and provide the imaging response to one or more remote systems 402. For instance, the PLC 418 may write a validated image from the imaging device 408 to an FTP server accessible to the user device 404. In addition, or alternatively, the PLC 418 may locally store the imaging response, for example, as a result of a heartbeat anomaly.

In some embodiments, the remote system 402 is a computing system that is located remotely from the imaging system 420 and communicatively connected to the imaging system 420 via a wireless communication network. The remote system 402 may include memory and one or more processors that are configured to perform one or more operations of the present disclosure. The remote system 402 may be associated with a conveyance line and may be communicatively connected to each of a plurality of imaging systems and the conveyance control system 422 of the conveyance line. The remote system 402 may be configured to receive a plurality of orders that may be fulfilled by the conveyance line, provide one or more control instructions to fulfill the orders, and monitor the progress of the orders through one or more data objects associated with the order. The data objects, for example, may include a container data object that may be associated with an order, a container selected to hold one or more objects identified by the order, and/or a container carrier configured to help the container move across the conveyance line. By way of example, the container data object may include an order identifier, a container identifier, a container carrier identifier, and/or one or more contextual attributes of the order, container, and/or container carrier. In some examples, the remote system 402 may facilitate a container database that includes a plurality of container data objects respectively corresponding to a plurality of orders that are facilitated by the conveyance line. In some examples, the remote system 402 may retain the container data object within the container database to provide a record reflective of the fulfillment of an order by the conveyance line.

Each of the plurality of computing systems of the computing ecosystem 400 may be connected via one or more difference machine networks. A first machine network, for example, may include a wireless network that carries data between the remote system 402 and the imaging system 420. The data, for example, may include container data (e.g., one or more portions of a container data object, etc.) indicating a container status, an order status for an order corresponding to a container, and/or the like. A second machine network may include a TCP device network configured between components of the imaging system 420 (e.g., the PLC 418, the imaging device 408, the I/O master link 406, etc.). The second machine network may carry instructions (e.g., commands, messages, etc.) between the PLC 418, imaging device 408, and/or the I/O master link 406 using Ethernet/IP Protocol. In addition, or alternatively, the second machine network may carry image data from the imaging device 408 to a user device 404 via file transfer protocol. A third machine network may include an I/O link network that may carry data between the height detection sensor 410 and the imaging device 408 via the I/O master link 406.

Using the above machine networks, the remote system 402 may communicate with an imaging system 420 to facilitate the automated verification, validation, and fulfillment of an order received by the remote system 402.

In some embodiments, the user device 404 is an interface device that communicatively connected to the imaging system 420 and physically located proximate to an imaging location. The user device 404 may include memory, one or more processors, and a user interface configured to receive user input and provide a user interpretable display to facilitate interactions between a user, the imaging system 420, the conveyance control system 422, and/or the remote system 402.

In some examples, the user device 404 may include an interface PC based C#.NET software. The user device 404 may monitor a tag on the PLC 418 that indicates when there is new camera inspection data available. When the PLC tag indicates new verification event is available, the user device may perform a series of actions, such as retrieving a container identifier, a classification result, a time stamp from the appropriate tags on the PLC 418, and/or the like. In some examples, the user device 404 may check the time stamp to verify a recency of the verification event (e.g., no more than 10 minutes old, etc.) and that there are no newer validation images of the container saved in a PCS database. If these conditions are met the process moves forward.

The user device 404 may access a container tracking database (e.g., a container database, etc.) and use the container identifier to receive a container data object for the container. The user device may check qualification criteria for the container and, if qualified, the user device 404 may receive a validation image for the container from an FTP server file save location. The user device 404 may verify that the validation image is not corrupted, and the file size is within acceptable size limits. If so, the user device 404 may writes the validation image along with the appropriate data to a user accessible validation images database table. The user device 4040 may verifies that the record was successfully written and then write a new verification record to a user accessible event requests database table and update a container data object of a container database.

In some examples, the user device 404 may provide a signal to the PLC 418 that the verification event has been received and processed. If there is a discrepancy between a measure fill level and an expected fill level, the user device 404 may write to a user accessible discrepancies database table and a copy of the validation image may be saved to a file server for user review.

In some examples, the user device 404 may provide a heartbeat for the PLC 418 to listen to and monitors a heartbeat the PLC 418 provides. The user device monitors alarms that the PLC 418 manages. If an alarm is activated on the PLC 418 the alarm and its description will be displayed on the user interface. The user interface provides a button for acknowledging/clearing alarms. The validation image and the relevant data from the container data object are displayed on the user interface. The user device 404 may writes relevant events to a log file. The user device 404, while looking for signals from the PLC 418 to begin searching for the validation image, does not have to run synchronous to the PLC 418. Results may be buffered in the PLC 418 and sent to the user device 404 at a later time.

Figure 5:
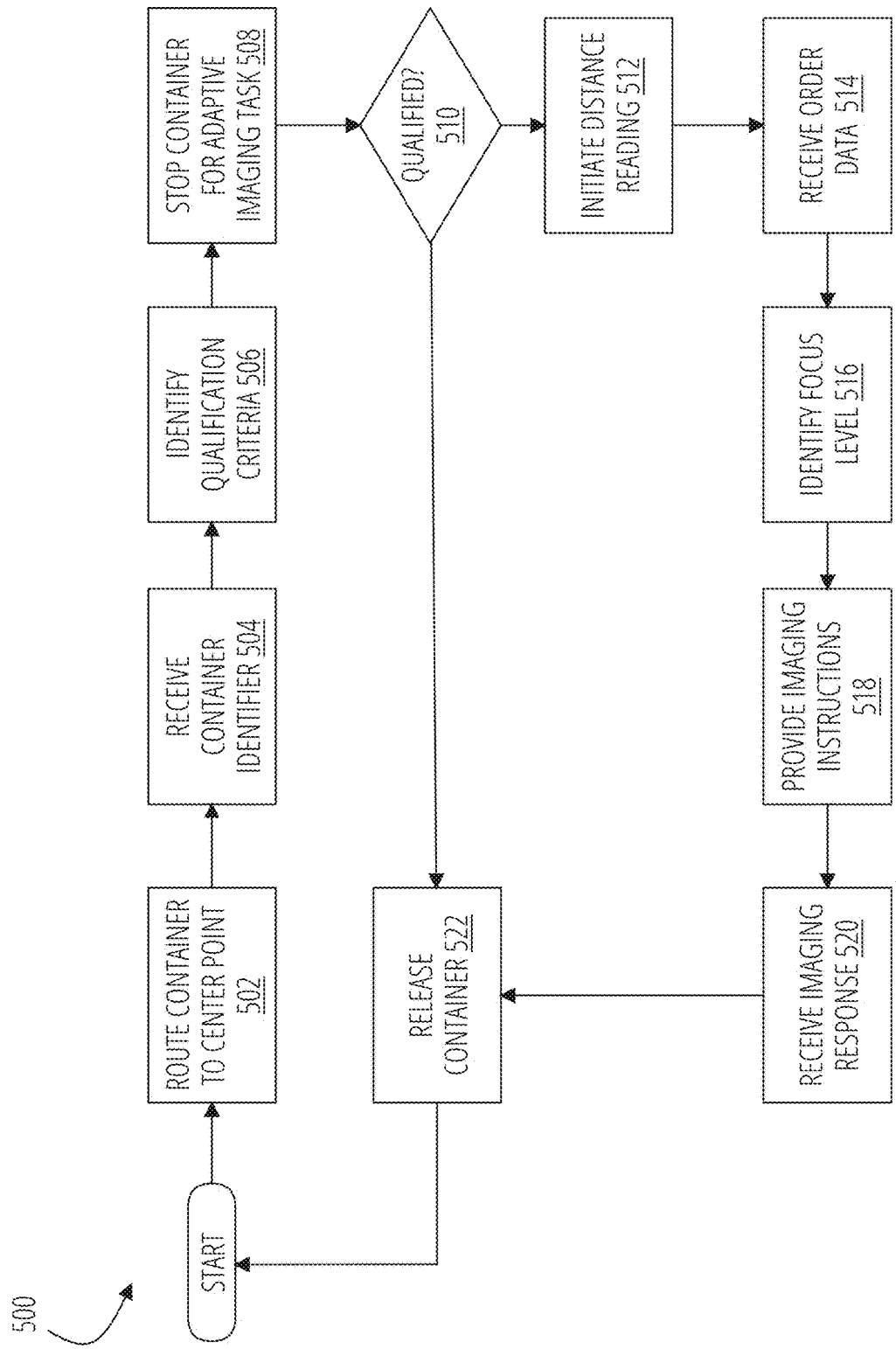
FIG. 5 is a flowchart diagram of an adaptive imaging process in accordance with some embodiments discussed herein.

FIG. 5 is a flowchart diagram of an adaptive imaging process 500 in accordance with some embodiments discussed herein. The flowchart depicts an adaptive imaging process 500 for generating improved validation images by adaptively modifying a focus level, and/or other imaging parameters of an imaging device, based on the characteristics of an object within an imaging location. The process 500 may be implemented by one or more computing devices, entities, and/or systems described herein. For example, via the various steps/operations of the process 500, the PLC 418 may leverage an improved imaging process to initiate imaging tasks that are specially tailored to an object. By doing so, the process 500 facilitates imaging techniques that improve image quality by directly addressing challenges unique to imaging systems.

FIG. 5 illustrates an example process 500 for explanatory purposes. Although the example process 500 depicts a particular sequence of steps/operations, the sequence may be altered without departing from the scope of the present disclosure. For example, some of the steps/operations depicted may be performed in parallel or in a different sequence that does not materially impact the function of the process 500. In other examples, different components of an example device or system that implements the process 500 may perform functions at substantially the same time or in a specific sequence.

In some embodiment, the PLC 418 receives presence data that identifies a presence of the container at an imaging position relative to an imaging system. In some embodiments, the process 500 is initiated in response to the presence data indicating that a container is located within and/or adjacent to the imaging location at which the imaging system is located. In some embodiments, presence data includes data that indicates the presence of an object at a particular location of a conveyance line. The presence data may include sensor data that is measured by one or more sensors positioned at a particular location. For instance, the presence data may include weight data measured by a weight sensor, photoelectric data measured by a photoelectric sensor, and/or the like. By way of example, the presence data may include feedback from a photoelectric sensor positioned at an imagining location along the conveyance line. The feedback, for example, may indicate that an object has entered an imaging station.

In some examples, the presence data is received from a photoelectric sensor placed on a conveyance line. The photoelectric sensor may detect the presence of a container within an imaging location of the conveyance line, generate presence data, and provide the presence data, via the electrical panel, to the PLC 418. The PLC 418 may receive the presence data, generate scanning instructions, and provide the scanning instructions to a scanning device associated with the imaging location to begin an iteration of the process 500.

In some embodiments, the process 500 includes, at step/operation 502, routing the container to a center point of the imaging system. For example, the PLC 418 may generate and provide one or more conveyance line operation instructions to a conveyance line controller to route the container to the center point of the imaging position. In this way, the PLC 418 may release a container (and/or a container carrier) toward an imaging position of an imaging device.

In some embodiments, the process 500 includes, at step/operation 504, receiving a container identifier for the container. For example, the PLC 418 may initiate an RFID read from an antenna at the imaging location. In some examples, the PLC 418 may receive, from a remote system, an imaging request. In such a case, the PLC 418 may initiate the RFID read to identify the container within the imaging location. The PLC 418 may initiate the RFID read via one or more scanning instructions. In some examples, the PLC 418 may receive a container identifier for the container in response to the presence data.

In some embodiments, a scanning instruction is a computer-readable instruction, control signal, message, and/or any other mechanism configured to trigger an action by a scanning device. A scanning device, for example, may include a barcode scanner, an RFID reader, and/or the like. The scanning instruction may include an instruction, signal, message, and/or the like to trigger a scanning operation by the scanning device. In response to the scanning instruction, the scanning device may perform a scanning operation to read a barcode, RFID, and/or the like from a container and/or a container carrier associated with the container. For example, an RFID reader may record a RFID signal emitted by an RFID device within a container carrier. In some examples, the scanning device may perform the scanning operation and generate a scanning response to respond to the scanning instructions.

In some embodiments, the PLC 418 receives a scanning response from a scanning device in response to one or more scanning instructions. A scanning response, for example, may include data generated in response to one or more scanning instructions. For example, a scanning response may include barcode indicia, an RFID signal, and/or the like. A scanning response may be reflective of an identifier for a container and/or a container carrier associated with a container. For example, a scanning response may include an RFID corresponding to container carrier that is electronically associated with and physically carries a container.

In some examples, the scanning device may perform a scanning operation and generate a scanning response in response to the scanning instructions received from a PLC 418. The scanning device may respond to the scanning instructions by returning a scanning response to the PLC 418. In this manner, the PLC 418 may receive an identifier that corresponds to a container within an imaging location. In some examples, the identifier may correspond to a container data object that represents the container. For example, the identifier may include a container identifier. By way of example, the container identifier may be associated with an RFID. The PLC 418 may receive the container identifier, in response to the presence data, by providing, to the scanning device, one or more scanning instructions to trigger an RFID scan of the container.

In some embodiments, a container identifier is a unique identifier that corresponds to a container. A container identifier may include a string of unique characters and/or numbers correspond to a container. In some examples, a container identifier may include and/or correspond to a container carrier associated with the container. The container carrier, for example, may include a RFID tag, barcode, and/or another scannable representation of an identifier. In some cases, the container identifier may include a unique identifier that corresponds to an RFID of a container carrier to allow for the tracking of the container through tracking the container carrier.

In some embodiments, the process 500 includes, at step/operation 506, identifying qualification criteria for the container. For example, the PLC 418 may determine that the container satisfies one or more qualification criteria based on the container identifier. For instance, the PLC 418 may identify the qualification criteria by querying a container database using the container identifier. The container database, for example, may be stored at a remote system and the PLC 418 may query the container database by providing the container identifier to the remote system.

In some embodiments, a container database is a data structure maintained by a remote system that stores a plurality of container data objects. A container database may include any type of storage data structure, including a relational database, a linked list, a graph-based data structure, and/or the like. A container database may be persisted by a remote system, which may generate a container data object for a container, store the container data object within the container database, continually modify the container data object as a corresponding container is moved across a conveyance line, and retain the container data object within the container database for a period of time after the container is taken off the conveyance line (e.g., to be shipped, etc.).

In some embodiments, a container data object is a data entity that represents a container. A container data object may include a plurality of container attributes, including one or more order attributes (e.g., pill capsule size, number of pill capsules, an expected fill level, etc.) associated with an order corresponding to the container, one or more carrier attributes (e.g., RFID, etc.) associated with a container carrier of the container, and/or the like. In some examples, the container data object may include one or more conveyance attributes associated with one or more events along the conveyance line. By way of example, a container data object may include and/or be associated with one or more verification events. In some examples, a container data object may reflect qualification criteria for performing an imaging task to generate a verification event.

In some embodiments, the qualification criteria are a data entities that describe one or more imaging constraints for a container. In some examples, the qualification criteria may define an order requirement for a container. For example, the qualification criteria may restrict imaging operations to containers that are associated with an order. In some examples, qualification criteria may be satisfied by receiving a container identifier (e.g., via an RFID scan of the container carrier associated with the container), identifying a container data object corresponding to the container identifier, and identifying an order associated with the container.

In some embodiments, the process 500 includes, at step/operation 508, stopping the container for an adaptive imaging task. For example, the PLC 418 may generate and provide one or more conveyance line operation instructions to a conveyance line controller to stop the container at the center point of the imaging position.

In some embodiments, the process 500 includes, at step/operation 510, determining whether the container is qualified for an adaptive imaging task. For example, the PLC 418 may determine whether the container is qualified for an adaptive imaging task based on the qualification criteria. For example, the PLC 418 may identify a container data object corresponding to the container within a container database. The PLC 418 may identify an order corresponding to the container based on the container data object and, in response to the order, determine that the container is qualified for the adaptive imaging task.

In the event that the container is qualified for the adaptive imaging task, the process 500 may proceed to step/operation 512 where a validation image may be captured for a container that satisfies the qualification criteria. In the event that the container is not qualified for the adaptive imaging task, the process 500 may proceed to step/operation 522 where the container may not be routed from the imaging location without a validation image.

In some embodiments, the process 500 includes, at step/operation 512, initiating a distance reading. For example, the PLC 418 may initiate, via the height detection sensor, a distance reading. In some examples, the PLC 418 may initiate the distance reading in response to the imaging request. In addition, or alternatively, the PLC 418 may initiate the distance reading in response to the presence data. For example, responsive to the satisfaction of the one or more qualification criteria, the PLC 418 may initiate a distance reading to receive the distance reading measurement.

In some embodiments, the process 500 includes, at step/operation 514, receiving order data for the container. For example, the PLC 418 may receive the order data by querying a container database using the container identifier. The container database, for example, may be stored at a remote system and the PLC 418 may query the container database by providing the container identifier to the remote system.

In some embodiments, the process 500 includes, at step/operation 516, identify a focus level for an imaging device. For example, the PLC 418 may identify the focus level based on a distance reading measurement from the height detection sensor. For instance, the PLC may receive sensor data from the height detection sensor. The sensor data may include a distance reading measurement. The PLC 418 may modify a focus level of the imaging device to one of a plurality of calibrated focus levels based on the sensor data. The plurality of calibrated focus levels, for example, may respectively correspond to a plurality of predefined fill level tiers that are stored within the memory of the PLC 418. In some examples, each of the plurality of predefined fill level tiers define a distance measurement range within which a distance reading measurement may fall.

In some embodiments, the distance reading measurement is a data value that is output by a height detection sensor. A distance reading measurement, for example, may include a millimeter accurate, single point, distance measurement between one or more sensor lenses of the height detection sensor and one or more objects (e.g., a stack of pill capsules, etc.) within a container. For example, in a clinical use case, a distance reading measurement may reflect a millimeter distance between the height detection sensor and a surface of a plurality of pill capsules dispensed within a pill vial.

In some examples, the height detection sensor may be calibrated using a calibration container (e.g., by zeroing the height detection sensor on a floor of an empty container, etc.). By doing so, the height detection sensor may generate a height measurement that indicates a distance between the floor of a container and a surface of one or more objects within the container. In this manner, a height detection sensor may reflect a height of one or more objects within a container. In some examples, a distance reading measurement may be triggered to initiate an adaptive imaging process in which a focus level of an imaging device is automatically calibrated based on a distance between the imaging device and a plurality of objects within a container. In some examples, the focus level may be determined based on a relative distance measurement.

In some embodiments, the relative distance measurement is a data entity that describes a proportion of a container that is filled with one or more objects. A relative distance measurement, for example, may reflect a percentage of a container that is filled by a plurality of objects. By way of example, the relative distance measurement may be identified by dividing the distance reading measurement by a height of a container (e.g., as reflected by a container data object, queued container data object, etc.). In a clinical example, the container height may be 55 mm for a pill vial and a relative distance measurement may include a percentage of the pill vial that is filled by one or more pill capsules. In some examples, a relative distance measurement may be compared to a plurality of predefined fill level tiers to identify a measured fill level of a container for imaging purposes.

In some embodiments, a measured fill level is a predefined data value that is determined from a predefined fill level tier based on the relative distance measurement. For example, a measured fill level may be one of a plurality of predefined fill level tiers. The measured fill level may include a predefined fill level tier that is associated with a fill level range that includes the relative distance measurement.

In some embodiments, at step/operation 516, the PLC 418 receives a measured fill level for a container based on the distance reading measurement. For example, the PLC 418 may provide, to the height detection sensor, one or more sensor instructions to trigger a distance reading measurement. As described herein, the height detection sensor may include a single point sensor that is calibrated based on a floor of a calibration container. The measured fill level for the container may be determined based on a comparison between the distance reading measurement and a height of the container. By way of example, the PLC 418 may determine a relative distance measurement based on a comparison between the distance reading measurement and the height of the container. The PLC 418 may identify the measured fill level from a plurality of predefined fill level tiers based on the relative distance measurement.

In some embodiments, a predefined fill level tier is one of a plurality of predefined fill level tiers that describe one or more fill level ranges for a container. Each of the predefined fill level tiers, for example, may define a non-overlapping fill level range. A fill level range may include a range of distance reading measurements, relative distance measurements, and/or the like. By way of example, a first predefined fill level tier may include range of 0-25%, a second predefined fill level tier may include a range of 26-50%, a third predefined fill level tier may include a range of 51-55%, and a fourth predefined fill level tier may include a range of 56-100%. In some examples, a focus level may be determined for an imaging device based on a calibrating mapping between a plurality of focus levels to a plurality of predefined fill level tiers of a container.

In some embodiments, the PLC 418 selects a focus level from a plurality of calibrated focus levels based on the measured fill level. The plurality of calibrated focus levels, for example, may respectively correspond to the plurality of predefined fill level tiers.

In some embodiments, a focus level is a set of camera settings that are used, by an imaging device, to capture an image. A focus level, for example, may include a combination of one or more lighting parameters, lens aperture parameters, and/or the like. In some examples, a focus level includes a preconfigured set of camera settings (e.g., a camera recipe) that correspond to a fill level of a container. For example, the focus level may be one of a plurality of calibrated focus levels that are locally stored by the imaging device.

In some embodiments, a calibrated focus level is one of a plurality of calibrated focus levels that is preconfigured for an imaging system. Each of the plurality of calibrated focus levels, for example, may include a set of camera settings that are optimized for a particular fill level of a container. By way of example, the plurality of calibrated focus levels may respectively correspond to a plurality of predefined fill level tiers.

In some embodiments, the process 500 includes, at step/operation 518, providing imaging instructions to the imaging device. For example, the PLC 418 may provide the imaging instructions to initiate an image at the identified focus level. For instance, the PLC 418 may generate one or more imaging instructions that identify an image name and the focus level for performing an adaptive imaging task. The PLC 418 may provide the one or more imaging instructions to the imaging device.

For instance, the PLC 418 may provide, to the imaging system, one or more imaging instructions to trigger a validation image at the focus level. In some embodiments, the imaging instructions include computer-readable instructions, control signals, messages, and/or any other mechanism configured to trigger an action by an imaging device. An imaging instruction, for example, may include one or more instructions and/or commands that are provided to an imaging device to trigger a validation image at a particular focus level. In some examples, one or more imaging instructions may be provided to the imaging device by a PLC. The imaging instructions may include data indicative of the measured fill level of the container. For instance, the imaging instructions may identify one of the plurality of predefined fill level tiers. In addition, or alternatively, the imaging instructions may identify one of the plurality of calibrated focus levels.

In some examples, the imaging instructions may include contextual data associated with an imaging operation. For example, the imaging instruction may identify an image name for the validation image, an object type associated with the container, and/or the like.

In some examples, a sequence of imaging instructions may be provided to sequentially perform one or more operations of an adaptive imaging process. For example, the PLC 418 may provide a first imaging instruction that defines a binned level of focus (e.g., a number identifying one of the plurality of calibrated focus levels) that is to be used ahead of an image capture trigger via Ethernet IP. The PLC 418 may then provide a second imaging instruction configured to trigger a soft event indicating the imaging system is OK to use the data. The PLC 418 may provide a third imaging instruction indicating a file name of the image that is to be saved. The PLC 418 may provide a fourth imaging instruction configured to trigger the imaging process based on the binned level of focus.

In some embodiments, the process 500 includes, at step/operation 520, receiving an imaging response from the imaging device. For example, the PLC 418 may receive an imaging response from the imaging device in response to the one or more imaging instructions. For instance, the PLC 418 may receive at least a portion of an imaging response from the imaging device. The at least a portion of the imaging response may include the validation image and/or contextual data for the validation image. In some examples, in response to receiving the at least a portion of the imaging response, the PLC may provide the at least a portion of the imaging response to the remote system.

In some embodiments, the PLC 418 receives, from the imaging device, an imaging response to the one or more imaging instructions that includes an image classification for the validation image. In some embodiments, the imaging response includes data that is generated in response to one or more imaging instructions. An imaging response may include a validation image and contextual data associated with the validation image. In some examples, the contextual data may include one or more classifications for the validation image. For instance, the imaging response may include the validation image, an image classification, a classification score, an image name, and a measured fill level of the container.

In some examples, the imaging device may provide at least a portion of the imaging response to the PLC 418. In addition, or alternatively, the imaging device may provide at least a portion of the imaging response to a user device. For example, the imaging device may provide the image classification, the classification score, and/or the image name to the PLC 418. In addition, or alternatively, the imaging device may provide the validation image and the image name to the user device. For example, the validation image may be written to an FTP server directly from the imaging device.

In some embodiments, a validation image is a data entity that describes an image of a container. The validation image may include an image that is captured at an imaging location of a conveyance line. The validation image, for example, may be captured by an imaging system mounted relative to (e.g., above, etc.) the imaging location. In some examples, a plurality of validation images is captured by a plurality of different imaging systems positioned at various imaging locations of a conveyance line. Each validation image may correspond one of a plurality of containers that are moved across one or more imaging positions of a conveyance line.

A validation image may depict a container moved by a conveyance line. In some examples, the validation image may depict the contents of the container. For example, a validation image may include an overhead view of the container. In such a case, the quality of the validation image may depend on the fill level of the container and the focus level of the imaging system. For example, image quality may decrease or increase for a particular focus level as a function of the fill level of the container. By way of example, in a clinical context, the container may include a pill vial holding one or more pill capsules that fill the pill vial to a particular level based on the size and number of the pill capsules. In this example, a validation image may include an overhead image of an open pill vial (e.g., before the pill vial is sealed, capped, etc.) that depicts an overhead view of the pill bottle before the pill bottle is capped and dispatched for delivery to an end user, such as a pharmacy, individual, and/or the like. In order to capture fine details of the pills within the pill vial, the overhead image may be captured at a focus level configured to a fill level of the pill vial.

Traditional imaging techniques fail to account for varying fill levels of containers transported by a conveyance line. This leads to validation images with inconsistent image quality in conveyance lines that handle containers with various different fill levels. To address this technical challenge, some embodiments of the present disclosure provide an enhanced imaging system and adaptive imaging process that adaptively adjusts a focus level for a validation image based on fill level of a container.

In some embodiments, a validation image is associated with one or more image attributes that describe one or more contextual details of the contents within a container. Examples of image attributes may include a product type identifier and one or more physical production attributes. A clinical example of a product type identifier may be a drug type identifier (e.g., a National Drug Code (NDC) identifier, etc.) for an object, such as a pill capsule (e.g., assigned to a puck container, a pill bottle, etc. that is imaged by a validation image, etc.). A physical production attribute may describe any property associated with the production line item reflected by a validation image. Examples of physical production attributes include a pharmacy site location identifier associated with a pharmacy site of a production line item, a fill line number associated with a fill line of a production line item, a camera identifier for a camera device used to capture a validation image of a production line item, attributes describing one or more camera/flash settings for a camera device used to capture a validation image of a production line item, attributes describing date and/or time of capture of a validation image of a production line item, and/or the like.

In some embodiments, a validation image is classified based on the one or more image attributes. For example, the imaging device may assign an image classification to the validation image using one or more machine learning techniques.

In some embodiments, an image classification is a data entity that describes a binary classification indicative whether a validation image corresponds to a validation category associated with the imaged container. In some examples, an image classification may be based on a classification score for the validation image. The image classification, for example, may include a positive classification (e.g., "1") in the event that a classification score satisfies a classification threshold (e.g., 80%, 90%, 95%, etc.). In addition, or alternatively, the image classification may include a negative classification (e.g., "0") in the event that a classification score fails to satisfy the classification threshold.

In some embodiments, the classification score is a machine learning output generated by a categorical validation ensemble model based on an input image. A classification score, for example, may include a validation prediction that describe a likelihood that a corresponding validation image reflects an object associated with a validation category that is associated with the container. The classification score may include a numerical range, a ratio, a percentage, and/or the like. In some examples, the classification score may include a number between zero and one. In some embodiments, a classification score includes a smoothed likelihood that the validation image reflects a validation category.

In some embodiments, a validation category is a data entity that describes a category defined by a subset of image attributes. For example, a validation category may correspond to one or more expected attributes of an object that is located within a container. By way of example, in a clinical example, a validation category may correspond to a particular drug type identifier (e.g., NDC), a particular drug type identifier and a particular pharmacy site location identifier, a particular drug type identifier, a particular pharmacy site location identifier, and a particular fill level, and/or any other combination of one or more defined image attributes.

In some embodiments, a categorical validation machine learning model is a data entity that is configured to describe parameters, hyper-parameters, and/or defined operations of a machine learning model that is configured to determine whether an input image corresponds to a target validation category. In some embodiments, the categorical validation machine learning model is configured to process at least one of the input images (e.g., as a matrix), extracted image-based features values associated with the input image (e.g., as a vector), and/or one or more physical production attributes for the input image (e.g., as a vector), in order to determine a classification score for the input image that describes whether the input image corresponds to a target validation category.

In some embodiments, the categorical validation machine learning model includes a convolutional neural network, such as a binary classification convolutional neural network, that is characterized by at least one (i) five layers including four two-dimensional convolutional layers and one flattening layer, (ii) filters that are increased across the two-dimensional convolutional layers to capture patterns and details in the input image, and/or (iii) each 2-dimensional convolutional layer utilizes a rectified linear unit (ReLU) activation function. In some embodiments, each two-dimensional convolution operation in a two-dimensional convolutional layer is followed by a pooling operation (e.g., with a size and stride of two), where dropout values are increased across two dimensional convolutional layers to a maximum value (e.g., a maximum value of 0.5). In some embodiments, the categorical validation machine learning model is trained using a binary cross-entropy loss function, with constant label smoothing (e.g., constant label smoothing at 0.1 to train the model with mislabeled data and with improved overall robustness and accuracy). In some embodiments, to train the categorical validation machine learning model, an optimization function such as Adam Optimizer function or a Stochastic gradient descent optimizer function is utilized. While various embodiments of the present disclosure describe that the categorical validation machine learning model includes a convolutional neural network, a person of ordinary skill in the relevant technology will recognize that any machine learning model (e.g., any neural network, such as any pre-trained neural network) may be utilized as part of the categorical validation machine learning model.

In some embodiments, a categorical validation ensemble model is a plurality of categorical machine learning models. A categorical validation ensemble model, for example, may include a separate categorical machine learning model for each validation category associated with a conveyance line. In some examples, for a pharmaceutical production line, a categorical validation ensemble model may include a separate categorical machine learning model for each NDC of a plurality of NDCs processed by the pharmaceutical production line.

In some embodiments, at step/operation 522, the PLC 418 generates a verification event based on the image classification. The PLC 418 may temporarily store the verification event in association with the container. The verification event, for example, may be stored in association with the container data object. In some examples, the verification event may be stored with the validation image comprises storing the validation image, the image classification, the measured fill level, the relative distance measurement, and/or the distance reading measurement.

A verification event may include a data entity that describes an event that is executed on a conveyance line. A verification event, for example, may describe an iteration of an imaging process for a container. For example, a verification event may store a plurality of contextual attributes identified during the performance of the imaging process 500. By way of example, the verification event may include the labeled validation image (e.g., labeled by the image name), an image classification, a classification score, and/or one or more height measurements for the contents of a container. The one or more height measurements, for example, may include an expected fill level (e.g., calculated based on a volume of the container, a number of objects, and a size of the objects, etc.), a measured fill level, a relative distance measurement, and/or a distance reading measurement for a container.

In some embodiments, the process 500 includes, at step/operation 522, releasing the container. For example, the PLC 418 may initiate a routing action for the container based on the imaging response and/or the indicative of whether the container is qualified for the imaging task. In some embodiments, the PLC 418 initiates a routing action for the container based on the verification event. The routing action may include one or more conveyance line movements configured to move the container to a location on a conveyance line based on the verification event. The routing action, for example, may be initiated by providing one or more conveyance line operation instructions to a conveyance control system.

In some embodiments, a conveyance line operation instruction is a computer-readable instruction, control signal, message, and/or any other mechanism configured to trigger an action by a conveyance control system. In some examples, a conveyance line operation instruction may be generated using a process control database. A process control database may include a set of one or more data entities (e.g., a set of data entities stored in a distributed manner) that contain data for a database that describes one or more prediction-based actions and/or action thresholds. The prediction-based actions and/or action thresholds may correspond to an image classification.

For example, the process control database may describe, for each validation category of a set of defined validation categories, an action threshold for the validation category and the one or more process control parameters for the validation category, where the action threshold for the validation category may describe a condition that, when satisfied by the image classification with respect to the validation category, causes performance of one or more control actions based on one or more process control parameters associated with the validation category. An action threshold, for example, may recommend that, when an image classification for a validation image with respect to a corresponding validation category exceeds a particular numeric value, the one or more control actions for the corresponding validation category should be performed. As another example, the action threshold may recommend that, when a validation prediction for a validation image with respect to a corresponding validation category falls below a particular numeric value, the one or more control actions for the corresponding validation category should be performed.

In some embodiments, a routing action is an action performed by a conveyance line in response to a conveyance line operation instruction. A routing action may include a halting action to halt the movement of at least a portion of containers located at a portion of the conveyance line. In addition, or alternatively, a routing action may include a container routing action to move a container to a particular location of the conveyance line.

For example, a routing action may include one or more control operations for controlling a motor (and/or other control mechanism) of a conveyance assembly to initiate a movement of a container from an origin location to a destination location. A routing action may include a movement of a conveyer belt to move a container in a forward direction. In addition, or alternatively, a routing action may include a movement of one or more diverting assemblies to reroute a container on a conveyance assembly.

In some examples, a first routing action may be performed in response to a negative image classification to divert a container. In addition, or alternatively, a second routing action may be performed in response to a positive image classification. For example, the second routing action may include a clearance action that moves a container in a forward direction without rerouting the container for further inspection. A clearance action, for example, may include a pass routing action allowing the container to proceed.

In some examples, a second routing action may divert a container for further inspection. An image review action, for example, may include a minor routing action which allows the container to be verified based on the validation image. For example, a process control action may be triggering an exception that causes a user interface depicting the validation image as well as the physical production attributes of the validation image to be presented to the human inspector.

In some examples, a third routing action may divert a container for further manual inspection. A manual inspection action, for example, may include a major routing action which requires a manual verification of the contents in a container. A manual inspection action may include triggering an exception that causes a container associated with a validation image to be diverted to a human inspector. A manual inspection action may be triggering an exception that causes a container associated with a validation image to be diverted to a human inspector and a user interface depicting the validation image to be presented to the human inspector.

In some embodiments, the process 500 repeats for the next container on the conveyance line. In this manner, the process 500 may be continuously performed to validate containers as they are moved past an imaging location of the conveyance line.

Figure 6A:
FIGS. 6A-B are operational examples of user interface screens of a user device in accordance with some embodiments discussed herein.
Figure 6B:
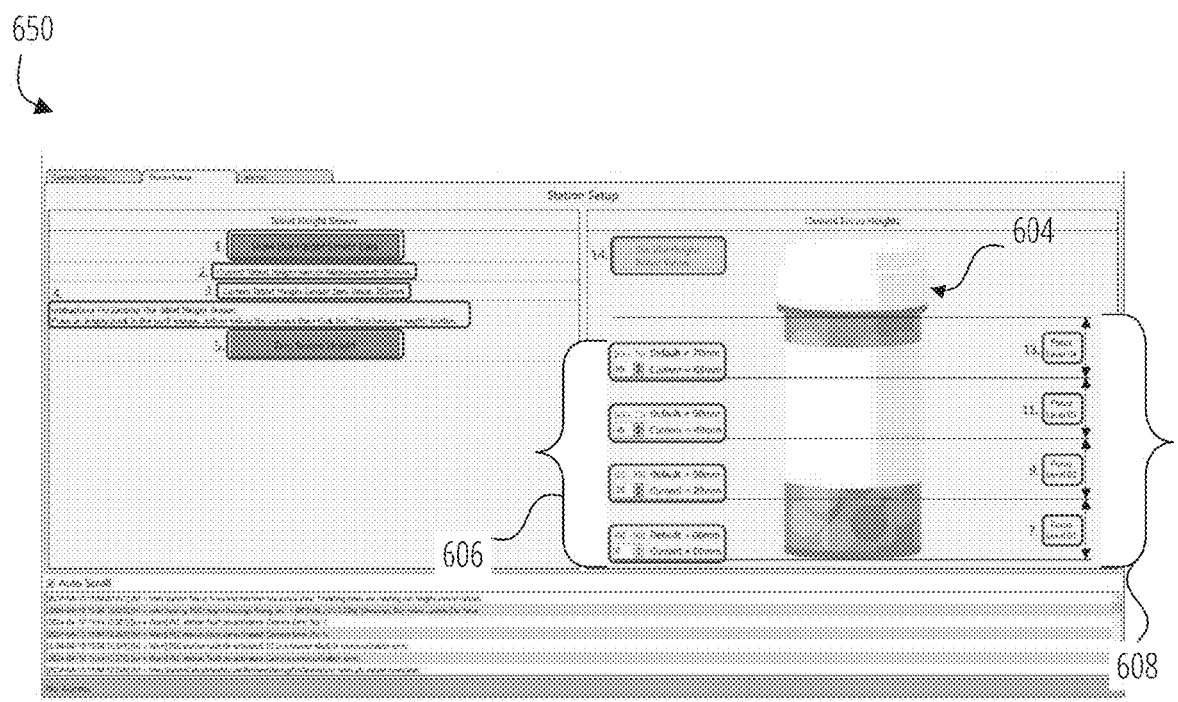

FIGS. 6A-B are operational examples of user interface screens of a user device in accordance with some embodiments discussed herein. The user interface screens illustrate a configuration and monitoring interface for an imaging system of a conveyance line.

FIG. 6A depicts a monitoring screen 600 that displays a representation of a validation image 602 including a top-down depiction of a pill vial with a plurality of pill capsules. The monitoring screen 600 may include a plurality of interactive user interface elements that display container information about the containers on a conveyance line as the containers pass through an imaging location.

The interactive user interface elements may include an auto scroll checkbox that may enable and/or disable an auto scrolling feature of a log preview pane. When it is checked the log preview pane may automatically scroll to show the most recent log items. When it is unchecked the log preview pane may continue to show the log items in the view as new log items are added to the list. The container identifier display may display a container identifier for a current container, the order number display may display an order number of the current container, the EVV (empty vial verification) result may display an EVV result for the validation image 602 of the current container, the station name may display a name of the imaging location, the station status may display the status of the imaging location (e.g., "Waiting for First Container", "Waiting for Container", "Processing Validation Image", "Stopping", "Stopped," or "Faulted"), the images processed count displays the total number of validation images that have been processed over an operational time period, and/or the like.

The user interface elements also include a camera interface start and stop buttons that may facilitate an enabling/disabling of an imaging system for performing an adaptive imaging process, as described herein.

FIG. 6B depicts a configuration screen 650 that displays a representation of a container 604 including a plurality of configurable predefined fill level tiers 606 and a plurality of configurable calibrated focus levels 608 corresponding to the plurality of configurable predefined fill level tiers 606.

The configuration screen 650 may include a station setup tab of the user interface, which may be used to zero the height detection sensor to adjust for heights of different containers and/or camera focus levels. The configuration screen may include a plurality of interactive elements, including a current tablet height sensor that display a distance reading measurements in real time, a current table height sensor zero value that displays a current tablet height sensor zero offset, a zero-sensor height button configurable to rezero the height detraction sensor, a plurality of focus level bounds that define a height range of the plurality of configurable predefined fill level tiers 606, and plurality of focus level settings for each of the plurality of configurable calibrated focus levels 608, among other elements as depicted.

Figure 7:
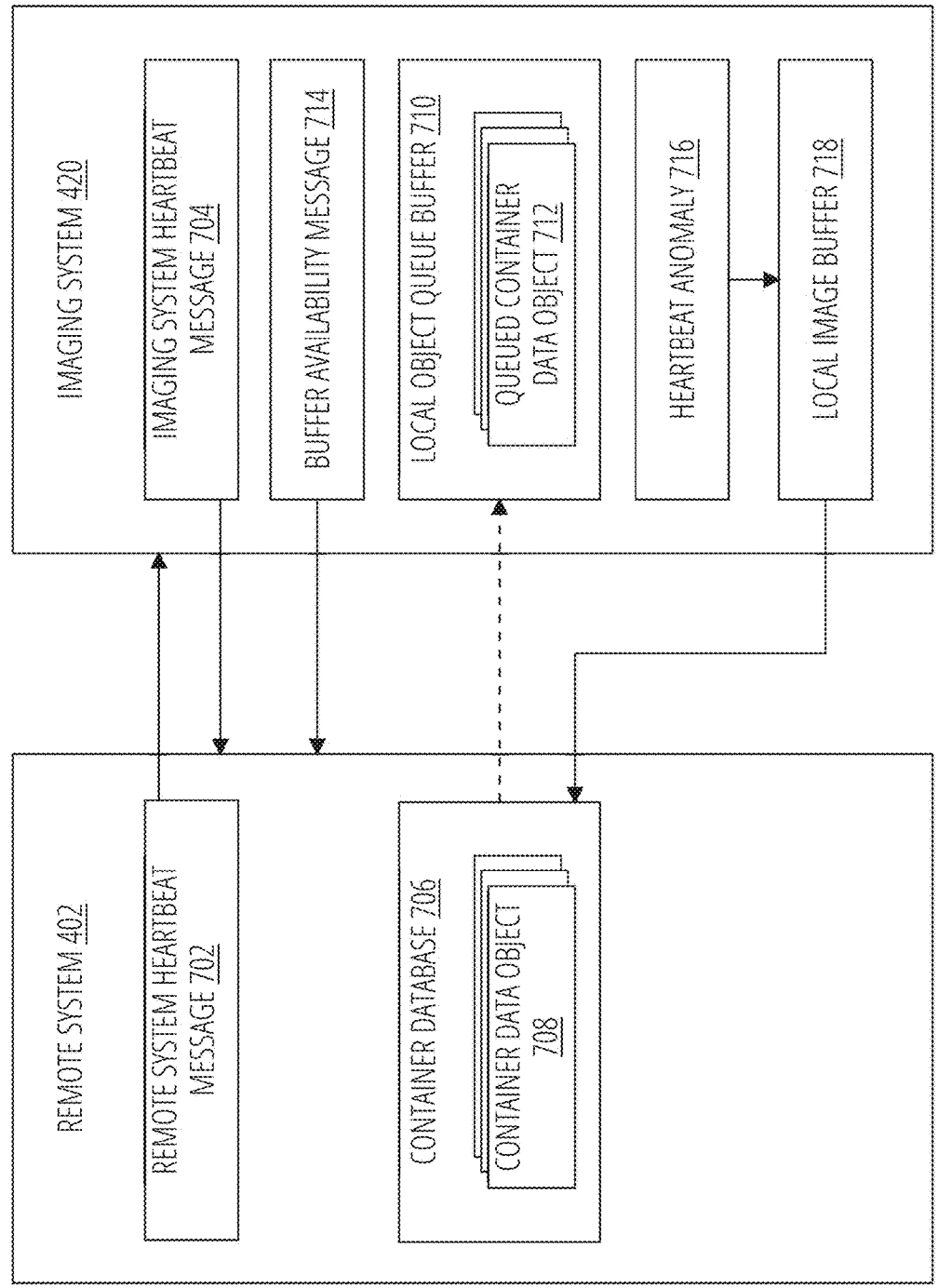
FIG. 7 is a dataflow diagram of an asynchronous imaging and verification process in accordance with some embodiments discussed herein.
Figure 8:
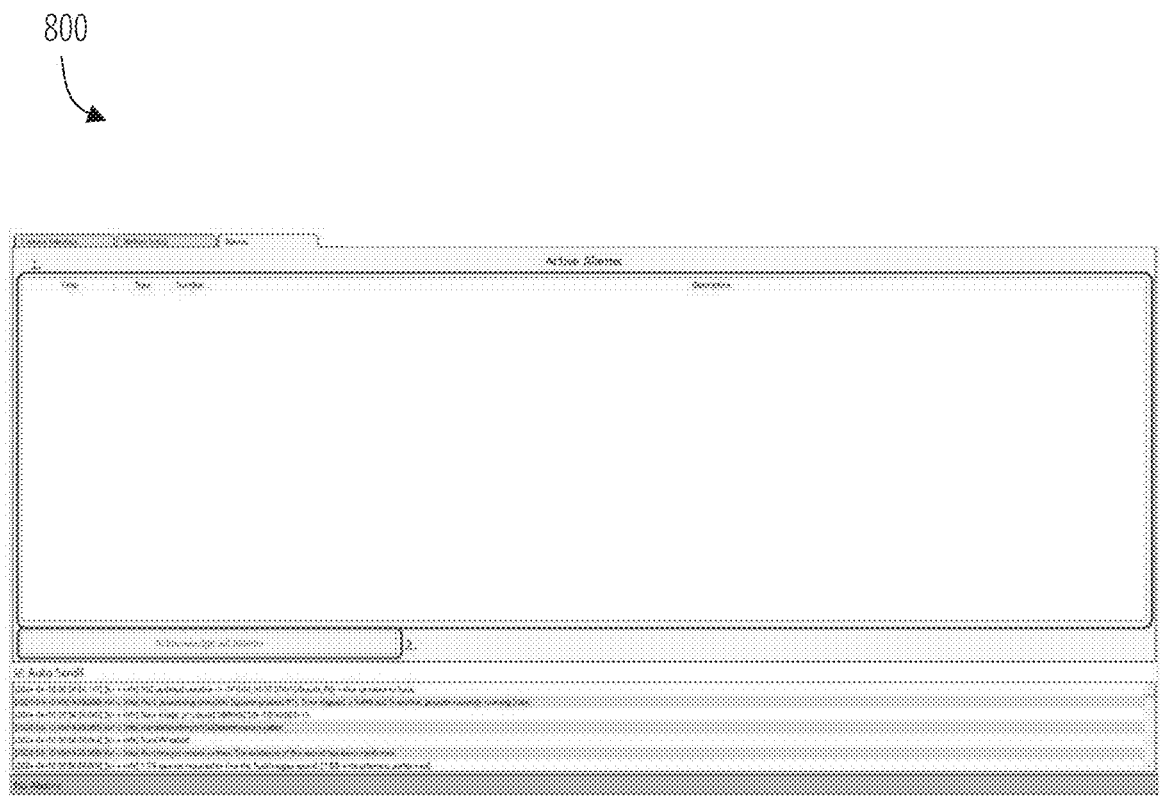
FIG. 8 is an operational example of an error tracking user interface screens of a user device in accordance with some embodiments discussed herein.

FIG. 7 is a dataflow diagram 700 of an asynchronous imaging and verification process in accordance with some embodiments discussed herein. As depicted, the asynchronous imaging and verification process may be facilitated by a sequence of interactions between a remote system 402 and an imaging system 420. In some examples, one or more errors generated during the course of the imaging and verification process may be provided to a user through a user device, as illustrated by FIG. 8.

In some embodiments, the remote system 402 and the imaging system 420 exchange heartbeat messages at one or more defined intervals to verify a wireless connection between the two systems. For example, the remote system 402 may provide and the imaging system 420 may receive a remote system heartbeat message 702 identifying a wireless connection between the remote system 402 and the imaging system 420. In addition, or alternatively, the imaging system 420 may provide and the remote system 402 may receive an imaging system heartbeat message 704 identifying the wireless connection between the remote system 402 and the imaging system 420. In some examples, the imaging system 420 may provide an imaging system heartbeat message 704 to the remote system 402 at a predetermined interval. The imaging system heartbeat message 704 may identify one of a plurality of imaging systems positioned at one of a plurality of imaging positions within the conveyance line.

In some embodiments, the imaging system heartbeat message 704 is a periodic message provided by the imaging system 420 to one or more connected systems. For example, an imaging system heartbeat message 704 may be provided by a PLC to a remote system 402 wirelessly connected to the imaging system 420. The imaging system heartbeat message 704 may include a network message transmitted to the remote system 402 that identifies the imaging system 420 (e.g., via a shared identifier, etc.). The imaging system heartbeat message 704 may be provided at a defined heartbeat interval to confirm a wireless connection between the imaging system 420 and the remote system 402.

In some embodiments, the remote system heartbeat message 702 is a periodic message provided by the remote system 402 to one or more connected systems. For example, a remote system heartbeat message 702 may be provided to a PLC by the remote system 402. The remote system heartbeat message 702 may include a network message transmitted to the imaging system 420 that identifies the remote system 402 (e.g., via a shared identifier, etc.). The remote system heartbeat message 702 may be provided at a defined heartbeat interval to confirm a wireless connection between the imaging system 420 and the remote system 402.

In some embodiments, the defined heartbeat interval is a heartbeat frequency of one or more heartbeat messages exchanged between connected systems within a computing ecosystem. In some examples, an imaging system heartbeat message 704 may be provided at a first defined heartbeat interval (e.g., five minutes, one hour, etc.) and a remote system heartbeat message 702 may be provided at a second defined heartbeat interval (e.g., five minutes, one hour, etc.). The first and second defined heartbeat interval may be the same or different.

In some embodiment, the imaging system 420 identifies, from the local object queue buffer 710, a queued container data object 712 that corresponds to a container located on the conveyance line. The local object queue buffer 710 may include a plurality of queued container objects. In some examples, the number of the plurality of queued container objects is constrained by a maximum buffer length.

In some embodiments, the local object queue buffer 710 is a data structure maintained by a PLC that stores a plurality of queued container data object 712s. A local object queue buffer 710 may include any type of storage data structure, including a relational database, a linked list, a graph-based data structure, a queue, stack, and/or the like. For example, the local object queue buffer 710 may include a first-in, first-out (FIFO) queue, and/or the like. In some examples, the local object queue buffer 710 may temporarily store a plurality of queued container data objects 712 that represent a plurality of containers enroute to an imaging system 420 of the conveyance line. For example, the local object queue buffer 710 may include a plurality of queued container data objects 712 representing a list of containers routed to the imaging system 420. Each queued container data object 712 may include container data (e.g., qualification criteria, an expected fill level of the container, and object type within container, etc.) that may be used to locally process a validation image of the container.

The local object queue buffer 710 may include a maximum buffer length. In some examples, the maximum buffer length may be based on one or more hardware constraints of the PLC. By way of example, the local object queue buffer 710 may have a maximum buffer length of 99 queued container data objects 712. In some examples, the local object queue buffer 710 may be automatically updated by the remote system 402 in response to one or more routing instructions configured to route a container to the imaging system 420. In addition, or alternatively, the local object queue buffer 710 may be updated in response to a buffer availability message 714 (e.g., after a container is processed by the imaging system 420).

In some embodiments, the local object queue buffer 710 stores a portion of the container data stored by a container database 706 of the remote system 402. For example, the imaging system 420 may continuously receive portions of the container data from the remote system 402 while a wireless connection is established. For example, the imaging system 420 may provide, to the remote system 402, a buffer availability message 714 714 indicating that the local object queue buffer 710 is partially empty. The imaging system 420 may receive from the remote system 402, one or more container data objects 708 respectively corresponding to one or more containers located on a conveyance line and enroute to the imaging system 420. The imaging system 420 may store the one or more container data objects 708 as one or more queued container data objects 712 within the local object queue buffer 710. In some examples, each container data object of the one or more container data objects 708 includes qualification criteria, an expected fill level, and/or a validation category associated with a particular container.

In some embodiments, a buffer availability message 714 is a computer-readable instruction, control signal, message, and/or any other mechanism configured to request container data for a container routed to the imaging system 420. In some examples, a buffer availably message may be provided to a remote system 402 in response to a completion of one or more imaging operations. In addition, or alternatively, a buffer availability message 714 may reflect a buffer status of the local object queue buffer 710 and may be provided at a predetermined timing interval.

In some embodiments, the queued container data object 712 is a data entity that represents a container and is locally stored within a local object queue buffer 710 within memory of the PLC. A queued container data object 712 may include a duplicate and/or a portion of a container data object 708 stored within a container database 706. A queued container data object 712 may be preloaded to the local object queue buffer 710 of the PLC in response to an availability of space within the local object queue buffer 710.

In some embodiments, the queued container data object 712 includes an RFID that corresponds to a container carrier associated with the container. The imaging system 420 may receive the RFID from an RFID reader and identify the queued container data object 712 from the local object queue buffer 710 based on the RFID.

In some embodiments, the imaging system 420 generates, using an imaging device, an imaging response for the container. The imaging response may include a validation image and an image classification that is based on a validation category. In some embodiments, the imaging system 420 generates a verification event for the container based on the imaging response.

In some embodiments, the imaging system 420 identifies a heartbeat anomaly 716 with the remote system 402. The imaging system 420 may identify the heartbeat anomaly 716 based on an elapsed time after a latest remote system heartbeat message 702. For example, the imaging system 420 may measure an elapsed time after a reception of a remote system heartbeat message 702 and detect the heartbeat anomaly 716 based on a comparison between the elapsed time and a defined heartbeat interval.

In some embodiments, the heartbeat anomaly 716 is a connection error that is identified using one or more exchanged heartbeat messages. For instance, a heartbeat anomaly 716 may be identified in the event that one or more heartbeat messages are not received within a defined heartbeat interval. For example, heartbeat messages from a remote system 402 (and/or PLC) may be monitored by a PLC (and/or the remote system 402). In the event that a heartbeat message is received within a defined interval, a heartbeat anomaly 716 may not be identified, and data may be provided to the remote system 402 in accordance with one or more operations of the present disclosure. In the event that the heartbeat message is not received, a heartbeat anomaly 716 exception is thrown, and an online anomaly recovery process may be triggered in response to the heartbeat anomaly 716 exception.

An online anomaly recovery process may include a sequence of suboperations. For example, a PLC may generate a connection loss alarm and provide the connection loss alarm to a user device to notify a user. In addition, or alternatively, validation images may be stored in a local image buffer 718 with a connection loss alarm tag.

In some examples, imaging operations may be continued after a heartbeat anomaly 716 using one or more local buffers. For example, the PLC may access a local object queue buffer 710 to receive information (e.g., a queued container data object 712) for a container that is loaded in at an imaging location. The imaging system 420 may perform an adaptive imaging process to generate a verification event for the next queued container object and store the verification event in a local image buffer 718. In response to a remote system heartbeat message 702 from remote system 402, the PLC may synchronize the image buffer with the remote system 402. In response to a continued heartbeat anomaly 716 (e.g., an absence of a remote system heartbeat message 702), the imaging system 420 may process another container using the local object queue buffer 710 until the local object queue buffer 710 is empty. If empty, the adaptive imaging process may be halted.

In some embodiments, in response to the heartbeat anomaly 716, the imaging system 420 generates a connection loss alarm tag and stores the verification event in a local image buffer 718 with the connection loss alarm tag. The imaging system 420 may store a plurality of tagged verification events in the local image buffer 718 until a remote system heartbeat message 702 is received or the local object queue buffer 710 is empty.

In some embodiments, the elapsed time is a measure of time after the reception of a heartbeat message. In some embodiments, the connection loss alarm tag is a data entity that identifies a loss of connection between an imaging system 420 and a remote system 402. A connection loss alarm tag may be stored with a validation image, a verification event, and/or like. In some embodiments, the local image buffer 718 is a portion of memory of the PLC that may temporarily store a plurality of validation images, verification events, and/or any other data generated during an adaptive imaging process.

In some embodiments, in response to receiving a remote system heartbeat message 702, the imaging system 420 may providing one or more verification events stored within the local image buffer 718 to the remote system 402 and remove the one or more verification events from the local image buffer 718.

In some embodiments, the imaging system 420 initiates one or more conveyance line operation instructions based on a position of the queued container data object 712 within the local object queue buffer 710. For example, the imaging system 420 may initiate the one or more conveyance line operation instructions in the event that the queued container data object 712 is the last queued container data object 712 in the local object queue buffer 710. In some examples, the one or more conveyance line operation instructions may be configured to disable a portion of the conveyance line that is associated with the imaging system 420 when the queued container data object 712 is a last queued container data object 712 in the local object queue buffer 710.

FIG. 8 is an operational example of an error tracking user interface screen 800 of a user device in accordance with some embodiments discussed herein. The error tracking user interface screen 800 may include an active alarms display that displays active alarms initiated for an imaging system. The active alarms display may display a time of the alarm, an alarm type, an alarm number, and/or an alarm description. In some examples, an alarm may be one of two different types, a fault or a warning. A fault may include an item that may prevent the imaging system from running, whereas a warning may include an item that may require attention but will not prevent the imaging system from running. Faults may be displayed in red, and warnings may be displayed in yellow. In some examples, the error tracking user interface screen 800 may include an acknowledgment alarms element that acknowledges one or more active alarms, providing a mechanism for clearing the alarms from the error tracking user interface screen 800.

Figure 9:
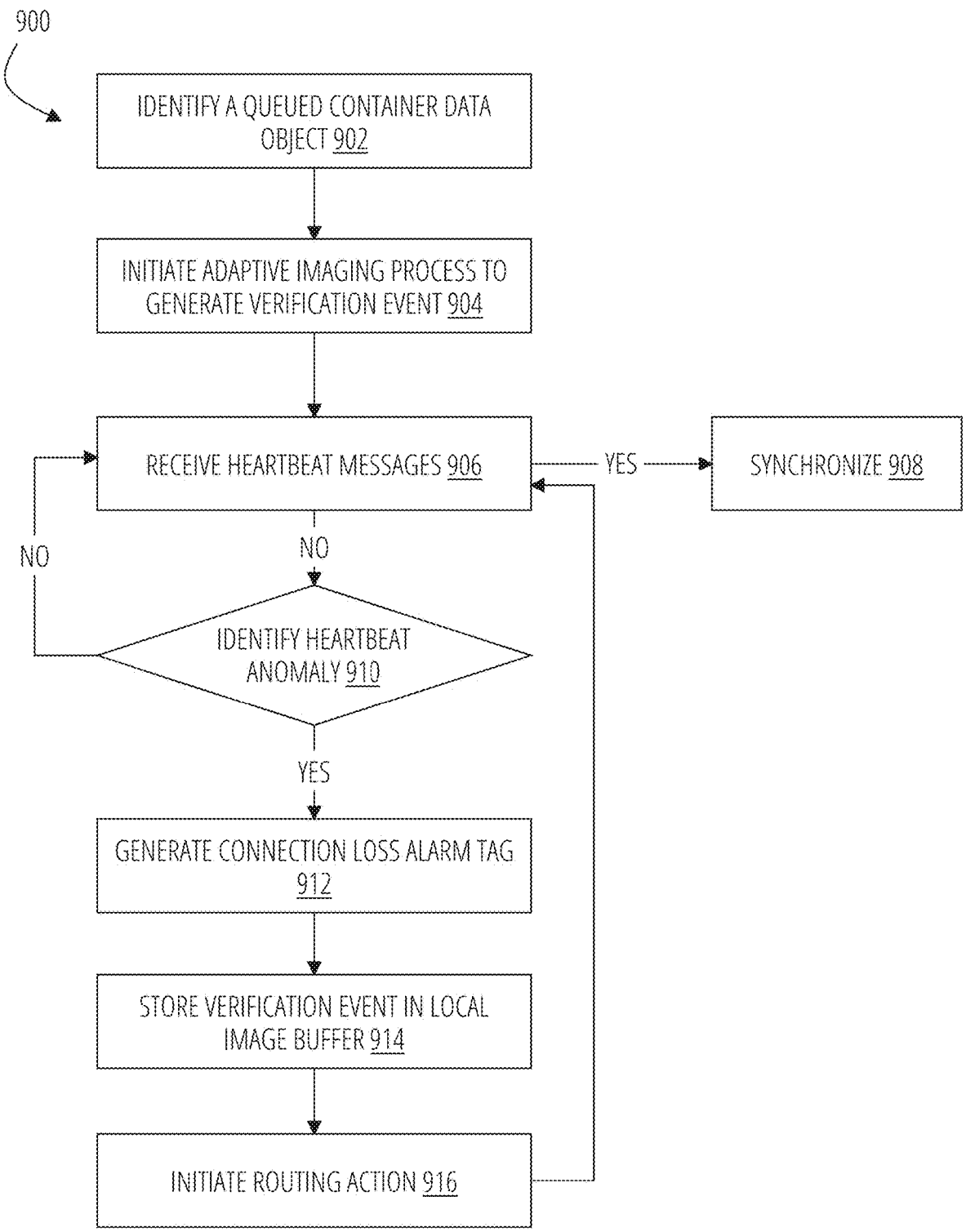
FIG. 9 is a flowchart diagram of an asynchronous imaging and verification process in accordance with some embodiments discussed herein.

FIG. 9 is a flowchart diagram of an asynchronous imaging and verification process 900 in accordance with some embodiments discussed herein. The flowchart depicts an asynchronous process 900 for transferring and storing data across different computing systems within a computing ecosystem to increase the error tolerance of a continuous imaging and verification procedure. The process 900 may be implemented by one or more computing devices, entities, and/or systems described herein. For example, via the various steps/operations of the process 900, the imaging system 420 may leverage continuous heartbeat exchanges and local memory data structures to detect and handle loses in network connectivity between the imaging system 420 and other computing systems within a computing ecosystem. By doing so, the asynchronous process 900 facilitates an asynchronous verification of objects to specifically address challenges unique to networked devices and improve the fault tolerance of connected systems. Ultimately, this allows for the integration of various imaging systems into a continuous verification loop, such as a conveyance line, without decreasing the throughput of the conveyance line.

FIG. 9 illustrates an example process 900 for explanatory purposes. Although the example process 900 depicts a particular sequence of steps/operations, the sequence may be altered without departing from the scope of the present disclosure. For example, some of the steps/operations depicted may be performed in parallel or in a different sequence that does not materially impact the function of the process 900. In other examples, different components of an example device or system that implements the process 900 may perform functions at substantially the same time or in a specific sequence.

In some embodiments, the process 900 includes, at step/operation 902, identifying a queue container data object. For example, the imaging system 420 may identify, from a local object queue buffer including a portion of container data from a remote system, a queued container data object that corresponds to a container located on a conveyance line. In some examples, the queued container data object includes an RFID that corresponds to a container carrier associated with the container. The imaging system 420 may receive the RFID from an RFID reader and identify the queued container data object from the local object queue buffer based on the RFID.

In some embodiments, the process 900 includes, at step/operation 904, initiating an adaptive imaging process to generate a verification event. For example, the imaging system 420 may generate, using an imaging device, an imaging response for the container. The imaging response may include a validation image and an image classification that is based on a validation category associated with the container. In some examples, the imaging system 420 may generate a verification event for the container based on the imaging response.

In some embodiments, the process 900 includes, at step/operation 906, receiving heartbeat messages. For example, the imaging system 420 may receive, from the remote system, a remote system heartbeat message identifying a wireless connection between the remote system and the imaging system. In addition, or alternatively, the imaging system 420 may provide an imaging system heartbeat message to the remote system at a predetermined interval. In some examples, the imaging system heartbeat message may identify one of a plurality of imaging systems positioned at one of a plurality of imaging positions within the conveyance line.

In the event that a remote system heartbeat message is received, the process 900 may proceed to step/operation 908 to synchronize the local data structures of the imaging system 420 with a remote system. Otherwise, the process 900 may proceed to step/operation 910 to identify a heartbeat anomaly.

In some embodiments, the process 900 includes, at step/operation 908, synchronizing a local image buffer with a container database of a remote system. For example, in response to the remote system heartbeat message, the imaging system 420 may provide one or more verification events stored within the local image buffer to the remote system and/or remove the one or more verification events from the local image buffer.

In some embodiments, the imaging system 420 provides, to the remote system, a buffer availability message indicating that the local object queue buffer is partially empty. For example, the local object queue buffer may include a plurality of queued container objects and a number of the plurality of queued container object may be constrained by a maximum buffer length. When space is available, the imaging system 420 may receive, from the remote system, one or more container data objects respectively corresponding to one or more containers located on a conveyance line and enroute to the imaging system and store the one or more container data objects as one or more queued container data objects within the local object queue buffer. In some examples, a container data object of the one or more container data objects may include qualification criteria, an expected fill level, and/or a validation category associated with a particular container.

In some embodiments, the process 900 includes, at step/operation 910, identifying a heartbeat anomaly. For example, the imaging system 420 may identify a heartbeat anomaly with the remote system. In some examples, the imaging system 420 may measure an elapsed time after a reception of a remote system heartbeat message and detecting the heartbeat anomaly based on a comparison between the elapsed time and a defined heartbeat interval.

In the event that a heartbeat anomaly is detected, the process 900 may proceed to step/operation 912 to generate a connection loss alarm tag. Otherwise, the process 900 may return to step/operation 906 to continue listening for a remote system heartbeat message.

In some embodiments, the process 900 includes, at step/operation 912, generating a connection loss alarm tag. For example, the imaging system 420 may, in response to the heartbeat anomaly, generate a connection loss alarm tag.

In some embodiments, the process 900 includes, at step/operation 914, storing a verification event in a local image buffer. For example, the imaging system 420 may, in response to the heartbeat anomaly, store the verification event in a local image buffer with the connection loss alarm tag.

In some embodiments, the process 900 includes, at step/operation 916, initiating a routing action. For example, the imaging system 420 may initiate one or more conveyance line operation instructions based on a position of the queued container data object within the local object queue buffer. For example, the one or more conveyance line operation instructions may be configured to disable a portion of the conveyance line that is associated with the imaging system when the queued container data object is a last queued container data object in the local object queue buffer.

VI. CONCLUSION

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Some embodiments of the present disclosure may be implemented by one or more computing devices, entities, and/or systems described herein to perform one or more example operations, such as those outlined below. The examples are provided for explanatory purposes. Although the examples outline a particular sequence of steps/operations, each sequence may be altered without departing from the scope of the present disclosure. For example, some of the steps/operations may be performed in parallel or in a different sequence that does not materially impact the function of the various examples. In other examples, different components of an example device or system that implements a particular example may perform functions at substantially the same time or in a specific sequence.

Moreover, although the examples may outline a system or computing entity with respect to one or more steps/operations, each step/operation may be performed by any one or combination of computing devices, entities, and/or systems described herein. For example, a computing system may include a single computing entity that is configured to perform all of the steps/operations of a particular example. In addition, or alternatively, a computing system may include multiple dedicated computing entities that are respectively configured to perform one or more of the steps/operations of a particular example. By way of example, the multiple dedicated computing entities may coordinate to perform all of the steps/operations of a particular example.

Example 1. A computer-implemented method comprising identifying, by one or more processors and from a local object queue buffer comprising a portion of container data from a remote system, a queued container data object that corresponds to a container located on a conveyance line; generating, by the one or more processors and using an imaging device, an imaging response for the container; generating, by the one or more processors, a verification event for the container based on the imaging response; identifying, by the one or more processors, a heartbeat anomaly with the remote system; in response to the heartbeat anomaly, (i) generating a connection loss alarm tag, (ii) storing the verification event in a local image buffer with the connection loss alarm tag, and (iii) initiating one or more conveyance line operation instructions based on a position of the queued container data object within the local object queue buffer.

Example 2. The computer-implemented method of claim 1, wherein detecting the heartbeat anomaly comprises measuring an elapsed time after a reception of a remote system heartbeat message; and detecting the heartbeat anomaly based on a comparison between the elapsed time and a defined heartbeat interval.

Example 3. The computer-implemented method of any of the preceding claims, further comprising receiving, from the remote system, a remote system heartbeat message identifying a wireless connection between the remote system and an imaging system; and in response to the remote system heartbeat message, (i) providing one or more verification events stored within the local image buffer to the remote system, and (ii) removing the one or more verification events from the local image buffer.

Example 4. The computer-implemented method of any of the preceding claims, wherein the one or more conveyance line operation instructions are configured to disable a portion of the conveyance line that is associated with an imaging system when the queued container data object is a last queued container data object in the local object queue buffer.

Example 5. The computer-implemented method of any of the preceding claims, wherein the local object queue buffer comprises a plurality of queued container objects and a number of the plurality of queued container objects is constrained by a maximum buffer length.

Example 6. The computer-implemented method of claim 5, further comprising providing, to the remote system, a buffer availability message indicating that the local object queue buffer is partially empty; receiving, from the remote system, one or more container data objects respectively corresponding to one or more containers located on the conveyance line and enroute to an imaging system; and storing the one or more container data objects as one or more queued container data objects within the local object queue buffer.

Example 7. The computer-implemented method of claim 6, wherein a container data object of the one or more container data objects comprises qualification criteria, an expected fill level, and a validation category associated with a particular container.

Example 8. The computer-implemented method of claim 7, wherein the imaging response comprises a validation image and an image classification that is based on the validation category.

Example 9. The computer-implemented method of any of the preceding claims, further comprising providing an imaging system heartbeat message to the remote system at a predetermined interval, wherein the imaging system heartbeat message identifies one of a plurality of imaging systems positioned at one of a plurality of imaging positions within the conveyance line.

Example 10. The computer-implemented method of any of the preceding claims, wherein the queued container data object comprises a radio frequency identifier (RFID) that corresponds to a container carrier associated with the container and the computer-implemented method further comprises receiving the RFID from an RFID reader; and identifying the queued container data object from the local object queue buffer based on the RFID.

Example 11. A computing system comprising memory and one or more processors communicatively coupled to the memory, the one or more processors configured to identify, from a local object queue buffer comprising a portion of container data from a remote system, a queued container data object that corresponds to a container located on a conveyance line; generate, using an imaging device, an imaging response for the container; generate a verification event for the container based on the imaging response; identify a heartbeat anomaly with the remote system; in response to the heartbeat anomaly, (i) generating a connection loss alarm tag, (ii) storing the verification event in a local image buffer with the connection loss alarm tag, and (iii) initiating one or more conveyance line operation instructions based on a position of the queued container data object within the local object queue buffer.

Example 12. The computing system of claim 11, wherein detecting the heartbeat anomaly comprises measuring an elapsed time after a reception of a remote system heartbeat message; and detecting the heartbeat anomaly based on a comparison between the elapsed time and a defined heartbeat interval.

Example 13. The computing system of any of claim 11 or 12, wherein the one or more processors further comprise receiving, from the remote system, a remote system heartbeat message identifying a wireless connection between the remote system and an imaging system; and in response to the remote system heartbeat message, (i) providing one or more verification events stored within the local image buffer to the remote system, and (ii) removing the one or more verification events from the local image buffer.

Example 14. The computing system of any of claims 11 through 13, wherein the one or more conveyance line operation instructions are configured to disable a portion of the conveyance line that is associated with an imaging system when the queued container data object is a last queued container data object in the local object queue buffer.

Example 15. The computing system of any of claims 11 through 14, wherein the local object queue buffer comprises a plurality of queued container objects and a number of the plurality of queued container objects is constrained by a maximum buffer length.

Example 16. The computing system of claim 15, wherein the one or more processors are further configured to provide, to the remote system, a buffer availability message indicating that the local object queue buffer is partially empty; receive, from the remote system, one or more container data objects respectively corresponding to one or more containers located on the conveyance line and enroute to an imaging system; and store the one or more container data objects as one or more queued container data objects within the local object queue buffer.

Example 17. The computing system of claim 16, wherein a container data object of the one or more container data objects comprises qualification criteria, an expected fill level, and a validation category associated with a particular container.

Example 18. The computing system of claim 17, wherein the imaging response comprises a validation image and an image classification that is based on the validation category.

Example 19. One or more non-transitory computer-readable storage media including instructions that, when executed by one or more processors, cause the one or more processors to identify, from a local object queue buffer comprising a portion of container data from a remote system, a queued container data object that corresponds to a container located on a conveyance line; generate, using an imaging device, an imaging response for the container; generate a verification event for the container based on the imaging response; identify a heartbeat anomaly with the remote system; in response to the heartbeat anomaly, (i) generating a connection loss alarm tag, (ii) storing the verification event in a local image buffer with the connection loss alarm tag, and (iii) initiating one or more conveyance line operation instructions based on a position of the queued container data object within the local object queue buffer.

Example 20. The one or more non-transitory computer-readable storage media of claim 19, wherein the queued container data object comprises a radio frequency identifier (RFID) that corresponds to a container carrier associated with the container and the one or more processors are further caused to receive the RFID from an RFID reader; and identify the queued container data object from the local object queue buffer based on the RFID.

The invention claimed is:

1. A computer-implemented method comprising:
   identifying, by one or more processors and from a local object queue buffer comprising a portion of container data from a remote system, a queued container data object that corresponds to a container located on a conveyance line;
   generating, by the one or more processors and using an imaging device, an imaging response for the container;
   generating, by the one or more processors, a verification event for the container based on the imaging response;
   identifying, by the one or more processors, a heartbeat anomaly with the remote system; and
   in response to the heartbeat anomaly,
   (i) generating a connection loss alarm tag,
   (ii) storing the verification event in a local image buffer with the connection loss alarm tag, and
   (iii) initiating one or more conveyance line operation instructions based on a position of the queued container data object within the local object queue buffer.

2. The computer-implemented method of claim 1, wherein detecting the heartbeat anomaly comprises:
   measuring an elapsed time after a reception of a remote system heartbeat message; and
   detecting the heartbeat anomaly based on a comparison between the elapsed time and a defined heartbeat interval.

3. The computer-implemented method of claim 1, further comprising:
   receiving, from the remote system, a remote system heartbeat message identifying a wireless connection between the remote system and an imaging system; and
   in response to the remote system heartbeat message,
   (i) providing one or more verification events stored within the local image buffer to the remote system, and (ii) removing the one or more verification events from the local image buffer.

4. The computer-implemented method of claim 1, wherein the one or more conveyance line operation instructions are configured to disable a portion of the conveyance line that is associated with an imaging system when the queued container data object is a last queued container data object in the local object queue buffer.

5. The computer-implemented method of claim 1, wherein the local object queue buffer comprises a plurality of queued container objects and a number of the plurality of queued container objects is constrained by a maximum buffer length.

6. The computer-implemented method of claim 5, further comprising:
providing, to the remote system, a buffer availability message indicating that the local object queue buffer is at least partially empty;
receiving, from the remote system, one or more container data objects respectively corresponding to one or more containers located on the conveyance line and enroute to an imaging system; and
storing the one or more container data objects as one or more queued container data objects within the local object queue buffer.

7. The computer-implemented method of claim 6, wherein a container data object of the one or more container data objects comprises qualification criteria, an expected fill level, and a validation category associated with a particular container.

8. The computer-implemented method of claim 7, wherein the imaging response comprises a validation image and an image classification that is based on the validation category.

9. The computer-implemented method of claim 1, further comprising providing an imaging system heartbeat message to the remote system at a predetermined interval, wherein the imaging system heartbeat message identifies one of a plurality of imaging systems positioned at one of a plurality of imaging positions within the conveyance line.

10. The computer-implemented method of claim 1, wherein the queued container data object comprises a radio frequency identifier (RFID) that corresponds to a container carrier associated with the container and the computer-implemented method further comprises:
receiving the RFID from an RFID reader; and
identifying the queued container data object from the local object queue buffer based on the RFID.

11. A computing system comprising memory and one or more processors communicatively coupled to the memory, the one or more processors configured to:
identify, from a local object queue buffer comprising a portion of container data from a remote system, a queued container data object that corresponds to a container located on a conveyance line;
generate, using an imaging device, an imaging response for the container;
generate a verification event for the container based on the imaging response;
identify a heartbeat anomaly with the remote system; and
in response to the heartbeat anomaly,
(i) generating a connection loss alarm tag,
(ii) storing the verification event in a local image buffer with the connection loss alarm tag, and
(iii) initiating one or more conveyance line operation instructions based on a position of the queued container data object within the local object queue buffer.

12. The computing system of claim 11, wherein detecting the heartbeat anomaly comprises:
measuring an elapsed time after a reception of a remote system heartbeat message; and
detecting the heartbeat anomaly based on a comparison between the elapsed time and a defined heartbeat interval.

13. The computing system of claim 11, wherein the one or more processors are further configured to:
receive, from the remote system, a remote system heartbeat message identifying a wireless connection between the remote system and an imaging system; and
in response to the remote system heartbeat message,
(i) provide one or more verification events stored within the local image buffer to the remote system, and
(ii) remove the one or more verification events from the local image buffer.

14. The computing system of claim 11, wherein the one or more conveyance line operation instructions are configured to disable a portion of the conveyance line that is associated with an imaging system when the queued container data object is a last queued container data object in the local object queue buffer.

15. The computing system of claim 11, wherein the local object queue buffer comprises a plurality of queued container objects and a number of the plurality of queued container objects is constrained by a maximum buffer length.

16. The computing system of claim 15, wherein the one or more processors are further configured to:
provide, to the remote system, a buffer availability message indicating that the local object queue buffer is at least partially empty;
receive, from the remote system, one or more container data objects respectively corresponding to one or more containers located on the conveyance line and enroute to an imaging system; and
store the one or more container data objects as one or more queued container data objects within the local object queue buffer.

17. The computing system of claim 16, wherein a container data object of the one or more container data objects comprises qualification criteria, an expected fill level, and a validation category associated with a particular container.

18. The computing system of claim 17, wherein the imaging response comprises a validation image and an image classification that is based on the validation category.

19. One or more non-transitory computer-readable storage media including instructions that, when executed by one or more processors, cause the one or more processors to:
identify, from a local object queue buffer comprising a portion of container data from a remote system, a queued container data object that corresponds to a container located on a conveyance line;
generate, using an imaging device, an imaging response for the container;
generate a verification event for the container based on the imaging response;
identify a heartbeat anomaly with the remote system; and
in response to the heartbeat anomaly,
(i) generating a connection loss alarm tag, (ii) storing the verification event in a local image buffer with the connection loss alarm tag, and
(iii) initiating one or more conveyance line operation instructions based on a position of the queued container data object within the local object queue buffer.

20. The one or more non-transitory computer-readable storage media of claim 19, wherein the queued container data object comprises a radio frequency identifier (RFID) that corresponds to a container carrier associated with the container and the one or more processors are further caused to:
  receive the RFID from an RFID reader; and
  identify the queued container data object from the local object queue buffer based on the RFID.

* * * * *